United States Patent
Chang et al.

(10) Patent No.: US 10,187,726 B2
(45) Date of Patent: Jan. 22, 2019

(54) AUDIO ACCESSORY AND AUDIO OUTPUT METHOD

(71) Applicant: Samsung Electronics Co., Ltd., Gyeonggi-do (KR)

(72) Inventors: Ju-Hee Chang, Gyeonggi-do (KR); Je-Ok Lee, Gyeonggi-do (KR); Seon-Mi Kim, Gyeonggi-do (KR); Jun-Tai Kim, Gyeonggi-do (KR); Ho-Chul Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 83 days.

(21) Appl. No.: 15/354,433

(22) Filed: Nov. 17, 2016

(65) Prior Publication Data
US 2017/0150270 A1    May 25, 2017

(30) Foreign Application Priority Data

Nov. 24, 2015  (KR) .......................... 10-2015-0165077

(51) Int. Cl.
| H04R 1/10 | (2006.01) |
| H04R 5/04 | (2006.01) |
| G06F 3/16 | (2006.01) |
| H04R 3/12 | (2006.01) |
| H04R 29/00 | (2006.01) |

(52) U.S. Cl.
CPC ............... *H04R 5/04* (2013.01); *G06F 3/165* (2013.01); *H04R 3/12* (2013.01); *H04R 29/004* (2013.01)

(58) Field of Classification Search
CPC ..................................... H04R 5/04; H04R 3/12
USPC ..................................................... 381/74, 384
See application file for complete search history.

(56) References Cited

U.S. PATENT DOCUMENTS

| 5,655,025 A | * | 8/1997 | Kim ......................... H04R 5/04 381/11 |
| 8,957,805 B2 | | 2/2015 | Niwa |
| 2007/0127747 A1 | * | 6/2007 | Doyle .................. H04R 1/1041 381/309 |
| 2011/0099298 A1 | * | 4/2011 | Chadbourne ....... G06F 11/3051 710/10 |

* cited by examiner

*Primary Examiner* — Katherine A Faley
(74) *Attorney, Agent, or Firm* — The Farrell Law Firm, P.C.

(57) ABSTRACT

An audio accessory and an audio output method are provided. The audio accessory includes a connector configured to be connected to an external device, an audio output unit configured to output a sound, and a switching unit configured to select a signal path according to whether the sound output through the audio output unit is in a balanced mode or an unbalanced mode.

16 Claims, 17 Drawing Sheets

AUDIO ACCESSORY AND AUDIO OUTPUT METHOD

PRIORITY

This application claims priority under 35 U.S.C. § 119(a) to Korean Patent Application Serial No. 10-2015-0165077, which was filed in the Korean Intellectual Property Office on Nov. 24, 2015, the entire disclosure of which is incorporated herein by reference.

BACKGROUND

1. Field of the Disclosure

The present disclosure generally relates to an audio accessory and an audio output method, and more particularly, to an audio accessory and an audio output method for receiving a high-quality call signal or music signal from a mobile terminal.

2. Description of the Related Art

A mobile terminal user may call the user of another mobile terminal using his or her mobile terminal or listen to music extracted from content stored in the mobile terminal, through an earphone.

One example of a connector that electrically connects a conventional earphone to a mobile terminal is a single ear connector. Various single connectors have been commercialized. A fixed pin map (for example, left (L), right (R), ground (G), microphone (M)) is provided to receive an unbalanced signal (for example, a call sound) through the single ear connector.

Another example of a connector that electrically connects a conventional earphone to a mobile terminal is an ear connector including two or more cables and two or more connectors. A different pin map (for example, left positive (L+), left negative (L−), right positive (R+), right negative (R−)) is provided to receive a balanced signal (for example, high-quality music) as well as an unbalanced signal through the two connectors.

If a user wants to listen to music through an earphone, a plurality of connectors or a plurality of cables capable of receiving and outputting a balanced signal are required, from among various types of connectors that connect an earphone to a mobile terminal.

Therefore, a user with an earphone capable of receiving and outputting only an unbalanced signal, including a single ear connector and a fixed pin map may install an earphone capable of outputting a balanced signal in order to listen to a high-quality balanced signal. As a result, economic cost and time cost are inflicted on the user.

An audio product with the balanced signal output function requires two or more ear connectors (left and right connectors), thus imposing limitations on a mobile terminal in terms of installation space and fabrication cost.

SUMMARY

An aspect of the present disclosure is to address at least the above-mentioned problems and/or disadvantages and to provide at least the advantages described below. Accordingly, an aspect of the present disclosure is to provide a structure for enabling reception of a balanced signal (play of high-quality music) as well as execution of a basic function (call or play of unbalanced music) by means of a single ear connector In accordance with an aspect of the present disclosure, there is provided an audio accessory. The audio accessory includes a connector configured to be connected to an external device, an audio output unit configured to output a sound, and a switching unit configured to select a signal path according to whether the sound output through the audio output unit is in a balanced mode or an unbalanced mode.

In accordance with another aspect of the present disclosure, there is provided an audio accessory. The audio accessory includes an audio output unit, a switching unit, and a processor. The processor is configured to select an output mode for outputting a sound, between a first output mode and a second output mode, to switch to a sound output path corresponding to the selected output mode, between a first sound output path corresponding to the first output mode and a second sound output path corresponding to the second output mode, and to output a sound in the sound output path using the audio output unit.

In accordance with another aspect of the present disclosure, there is provided an audio output method. The audio output method includes connecting to an external device, outputting a sound received from the external device, and selecting a signal path according to whether the sound is in a balanced mode or an unbalanced mode.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
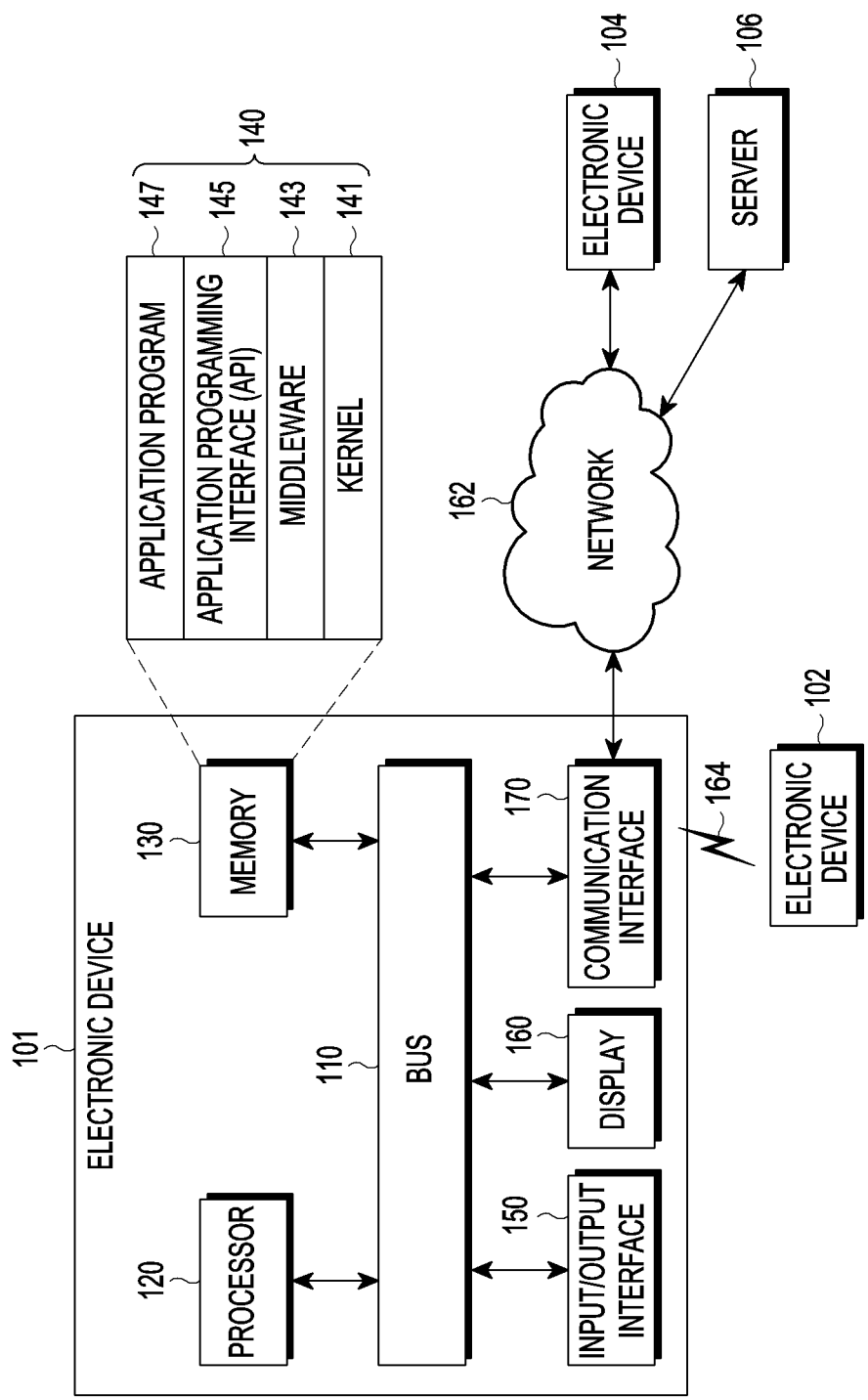
FIG. 1 is a block diagram illustrating an electronic device and a network according to an embodiment of the present disclosure.

Embodiments of the present disclosure are described with reference to the accompanying drawings. However, the scope of the present disclosure is not limited to the particular embodiments and it is to be understood that the present disclosure covers all modifications, equivalents, and/or alternatives falling within the scope and spirit of the present disclosure. In relation to a description of the drawings, like reference numerals denote like components.

In the present disclosure, the terms 'have', 'may have', 'include', or 'may include' signify the presence of a specific feature (for example, number, function, operation, or component such as part), and do not exclude the presence of one or more other features.

In present disclosure, the terms 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The terms, 'first' or 'second' may modify the names of various components irrespective of sequence and/or importance, but are not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When a component (for example, a first component) is described as 'operatively or communicatively coupled with/ to' or 'connected to' another component (for example, a second component), it should be understood that the one component is connected to the other component directly or through any other component (for example, a third component). On the other hand, when a component (for example, a first component) is described as 'directly connected to' or 'directly coupled to' another component (for example, a second component), it may be understood that there is no other component (for example, a third component) between the components.

The term 'configured to' as used herein may be used interchangeably with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a general-purpose processor (for example, a central processing unit (CPU) or an application processor (AP)) for performing the operations.

The terms as used in the present disclosure are provided to describe specific embodiments, and do not limit the scope of other embodiments. It is to be understood that singular forms include plural forms unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

An electronic device according to an embodiment of the present disclosure may be at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical equipment, a camera, or a wearable device. The wearable device may be at least one of an accessory type (for example, a watch, a ring, a bracelet, an ankle bracelet, a necklace, glasses, contact lenses, or a head-mounted device (HMD)), a fabric or clothing type (for example, electronic clothes), a body-attached type (for example, a skin pad or a tattoo), or an implantable type (for example, an implantable circuit).

An electronic device may be a home appliance. For example, the home appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, and the like), a game console (for example, Xbox™, PlayStation™, and the like), an electronic dictionary, an electronic key, a camcorder, or an electronic picture frame.

According to an embodiment of the present disclosure, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, and the like), a navigation device, a global navigation satellite system (GNSS), an event data recorder (EDR), a flight data recorder (FDR), an automotive infotainment device, a naval electronic device (for example, a naval navigation device, a gyrocompass, and the like), an avionic electronic device, a security device, an in-vehicle head unit, an industrial or consumer robot, an automatic teller machine (ATM), a point of sales (POS) terminal, or an Internet of Things (IoT) device (for example, a light bulb, various sensors, an electricity or gas meter, a sprinkler, a fire alarm, a thermostat, a street lamp, a toaster, sporting goods, a hot water tank, a heater, or a boiler).

According to an embodiment of the present disclosure, an electronic device may be at least one of furniture, part of a building/structure, an electronic board, an electronic signature receiving device, a projector, and various measuring devices (for example, water, electricity, gas or electromagnetic wave measuring devices). An electronic device may be one or a combination of two or more of the foregoing devices. An electronic device may be a flexible electronic device. In addition, it will be apparent to one having ordinary skill in the art that an electronic device is not limited to the foregoing devices and covers a new electronic device produced along with new technology development.

With reference to the attached drawings, an electronic device according to an embodiment of the present disclosure will be described below. In the present disclosure, the term 'user' may refer to a person or device (for example, an artificial intelligence electronic device) that uses an electronic device.

Referring to FIG. 1, an electronic device 101 in a network environment 100 according to an embodiment of the present disclosure is described. The electronic device 101 includes a bus 110, a processor 120, a memory 130, an input/output (I/O) interface 150, a display 160, and a communication module 170. At least one of the components may be omitted in the electronic device 101 or a component may be added to the electronic device 101.

The bus 110 may include a circuit that interconnects, for example a processor 120, a memory 130, an input/output (I/O) interface 150, a display 160, and a communication module 170 and allows communication (for example, control messages and/or data) between the foregoing components.

The processor 120 may include one or more of a CPU, an AP, or a communication processor (CP). The processor 120 may, for example, execute computational or data processing related to control and/or communication of at least one other component of the electronic device 101.

The memory 130 may include a volatile memory and/or a non-volatile memory. The memory 130 may, for example, store instructions or data related to at least one other component. According to an embodiment of the present disclosure, the memory 130 may store software and/or programs 140. The programs 140 include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs such as the middleware 143, the API 145, or the application programs 147. Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

The middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is an interface that may control functions that the application programs 147 provide at the kernel 141 or the middleware 143. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (for example, text, an image, a video, an icon, or a symbol) to the user. The display 160 may include a touch screen and receive, for example, a touch input, a gesture input, a proximity input, or a hovering input through an electronic pen or a user's body part.

The communication module 170 may establish communication, for example, between the electronic device 101 and a first external electronic device 102, a second external electronic device 104, or a server 106. For example, the communication module 170 may be connected to a network 162 by wireless communication or wired communication and communicate with the second external electronic device 104 or the server 106 over the network 162.

The wireless communication may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. The wireless communication may include, for example, short-range communication 164. The short-range communication 164 may be conducted by, for example, at least one of wireless fidelity (WiFi), Bluetooth, near field communication (NFC), or GNSS. GNSS may include, for example, at least one of global positioning system (GPS), global navigation satellite system (Glonass), Beidou navigation satellite system (Beidou), or Galileo, the European global satellite-based navigation system, according to a region using the GNSS or a used bandwidth. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), or plain old telephone service (POTS). The network 162 may be a telecommunication network, for example, at least one of a computer network (for example, local area network (LAN) or wide area network (WAN)), the Internet, or a telephone network.

Each of the first and second external electronic devices 102 and 104 may be of the same type as or a different type from the electronic device 101. According to an embodiment of the present disclosure, the server 106 may include a group of one or more servers. All or a part of operations performed in the electronic device 101 may be performed in one or more other electronic devices 102 and 104 or the server 106. If the electronic device 101 is to perform a function or a service automatically or upon request, the electronic device 101 may request at least a part of functions related to the function or the service to the electronic device 102 or 104 or the server 106, instead of performing the function or the service autonomously, or additionally. The electronic device 102 or 104 or the server 106, may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
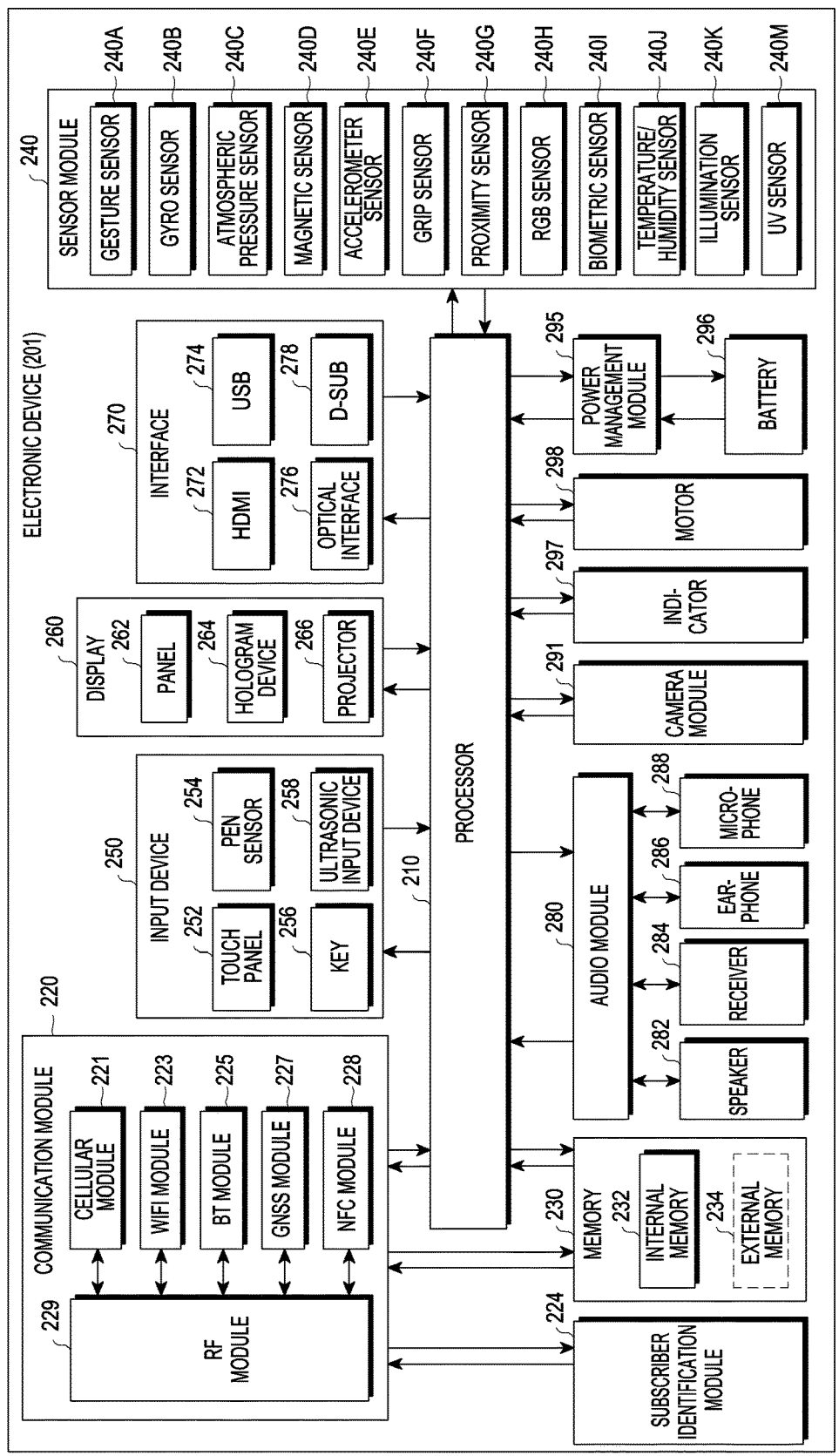
FIG. 2 is a block diagram illustrating an electronic device according to an embodiment of the present disclosure.

FIG. 2 is a block diagram of an electronic device 201 according to an embodiment of the present disclosure. The electronic device 201 may include, for example, the whole or part of the electronic device 101 illustrated in FIG. 1. The electronic device 201 includes at least one processor (for example, AP) 210, a communication module 220, a memory 230, a sensor module 240, an input device 250, and a display 260. The electronic device 201 may further include at least one of a subscriber identification module (SIM) 224, an interface 270, an audio module 280, a camera module 291, a power management module 295, a battery 296, an indicator 297, and a motor 298.

The processor 210 may, for example, control a plurality of hardware or software components that are connected to the processor 210 by executing an OS or an application program and may perform processing or computation of various types of data. The processor 210 may be implemented, for example, as a system on chip (SoC). According to an embodiment of the present disclosure, the processor 210 may further include a graphics processing unit (GPU) and/or an image signal processor. The processor 210 may include at least a part (for example, a cellular module 221) of the components illustrated in FIG. 2. The processor 210 may load a command or data received from at least one of other components (for example, a non-volatile memory), process the loaded command or data, and store various types of data in the non-volatile memory.

The communication module 220 may have the same configuration as or a similar configuration to the communication interface 170 illustrated in FIG. 1. The communication module 220 includes at least one of, for example, the cellular module 221, a WiFi module 223, a Bluetooth (BT) module 225, a GNSS module 227 (for example, a GPS module, a Glonass module, a Beidou module, or a Galileo module), an NFC module 228, and a radio frequency (RF) module 229.

The cellular module 221 may provide services such as voice call, video call, text service, or Internet access service, for example, through a communication network. According to an embodiment of the present disclosure, the cellular module 221 may identify and authenticate the electronic device 201 within a communication network, using the SIM card 224. The cellular module 221 may perform at least a part of the functionalities of the processor 210. The cellular module 221 may include a CP.

Each of the WiFi module 223, the BT module 225, the GNSS module 227, and the NFC module 228 may include, for example, a processor that may process data received or transmitted by the module. According to an embodiment of the present disclosure, at least a part (for example, two or more) of the cellular module 221, the WiFi module 223, the BT module 225, the GNSS module 227, or the NFC module 228 may be included in a single integrated chip (IC) or IC package.

The RF module 229 may transmit and receive, for example, communication signals (for example, RF signals). The RF module 229 may include at least one of, for example, a transceiver, a power amplifier module (PAM), a frequency filter, a low noise amplifier (LNA), an antenna, and the like. According to an embodiment of the present disclosure, at least one of the cellular module 221, the WiFi module 223, the BT module 225, the GNSS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) includes, for example, an internal memory 232 and/or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state driver (SSD).

The external memory 234 may further include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 includes at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling one or more sensors included therein. The electronic device 201 may further include a processor configured to control the sensor module 240, as a part of or separately from the processor 210. Thus, while the processor 210 is in a sleep state, the control circuit may control the sensor module 240.

The input device 250 includes, for example, a touch panel 252. The input device 250 includes at least one of a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone 288, and identify data corresponding to the sensed ultrasonic signals.

The display 260 (for example, the display 160) includes a panel 262. The display 260 may further include a hologram device 264 and/or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may display an image by projecting light on a screen. The screen may be positioned, for example, inside or outside the electronic device 201. According to an embodiment of the present disclosure, the display 260 may further include a control circuit for controlling the panel 262, the hologram device 264, or the projector 266.

The interface 270 includes at least one of, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment of the present disclosure, the camera module 291 may include one or more image sensors (for example, a front sensor or a rear sensor), a lens, an image signal processor (ISP), or a flash (for example, an LED or a xenon lamp).

The power management module 295 may manage power of, for example, the electronic device 201. According to an embodiment of the present disclosure, the power management module 295 may include a power management integrated circuit (PMIC), a charger IC, or a battery gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. The motor 298 may convert an electrical signal into a mechanical vibration and generate vibrations or a haptic effect. The electronic device 201 may include a processing device for supporting mobile TV (for example, a GPU). The processing device for supporting mobile TV may process media data compliant with, for example, digital multimedia broadcasting (DMB), digital video broadcasting (DVB), or MediaFLO™.

Each of the above-described components of the electronic device may include one or more parts and the name of the component may vary with the type of the electronic device. According to an embodiment of the present disclosure, the electronic device may be configured to include at least one of the above-described components. Some component may be omitted from or added to the electronic device. One entity may be configured by combining a part of the components of the electronic device, to thereby perform the same functions of the components prior to the combining.

Figure 3:
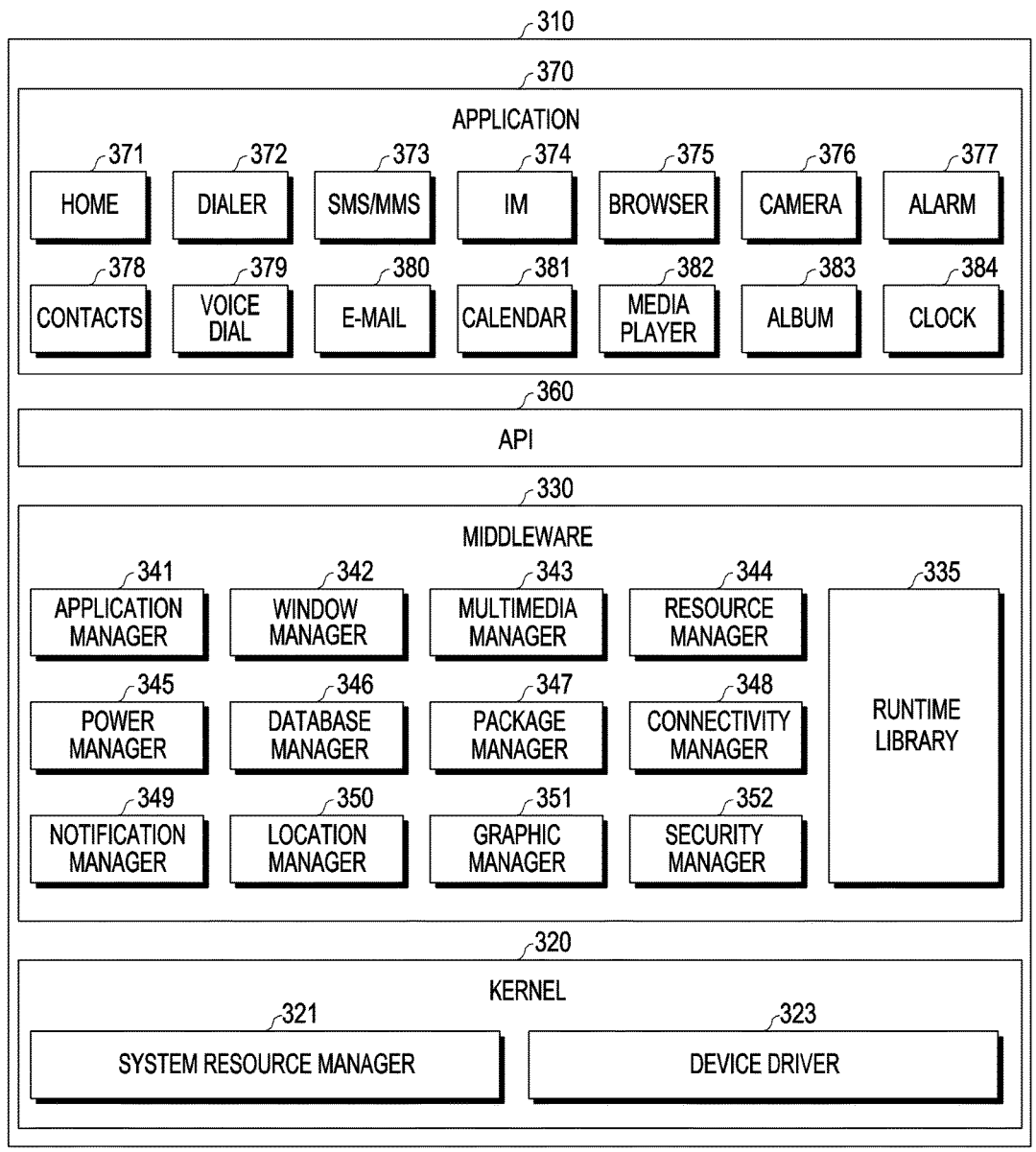
FIG. 3 is a block diagram illustrating a programming module according to an embodiment of the present disclosure.

FIG. 3 is a block diagram of a programming module according to an embodiment of the present disclosure. A programming module 310 (for example, a program 140) may include an OS that controls resources related to an electronic device (for example, the electronic device 101) and/or various applications executed on the OS (for example, the application programs 147). For example, the OS may be Android, iOS, Windows, Symbian, Tizen, Bada, and the like.

The programming module 310 includes a kernel 320, middleware 330, an application programming interface (API) 360, and/or applications 370. At least a part of the programming module 310 may be preloaded on the electronic device or downloaded from the electronic device 102 or 104, or the server 106.

The kernel 320 (for example, the kernel 141) may include, for example, a system resource manager 321 and/or a device driver 323. The system resource manager 321 may control, allocate, or deallocate system resources. According to an embodiment of the present disclosure, the system resource manager 321 may include at least one of a process manager, a memory manager, or a file system manager. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may efficiently use limited system resources available within the electronic device. According to an embodiment of the present disclosure, the middleware 330 (for example, the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, and the like.

The application manager 341 may manage, for example, the life cycle of at least one of the applications 370. The window manager 342 may manage GUI resources used for a screen. The multimedia manager 343 may determine formats required to play back various media files and may encode or decode a media file using a CODEC suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS) and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi, Bluetooth, and the like. The notification manager 349 may indicate or notify an event such as message arrival, a schedule, a proximity alarm, and the like in a manner that does not bother a user. The location manager 350 may manage position information about the electronic device. The graphic manager 351 may manage graphical effects to be provided to the user or related user interfaces. The security manager 352 may provide an overall security function required for system security, user authentication, and the like. According to an embodiment of the present disclosure, if the electronic device (for example, the electronic device 101) has a telephony function, the middleware 330 may further include a telephony manager to manage a voice or video call function of the electronic device.

A new middleware module may be created and used by combining various functions of the above-described component modules in the middleware 330. The middleware 330 may provide a customized module for each OS type in order to provide differentiated functions. In addition, the middleware 330 may dynamically delete a part of the existing components or add a new component.

The API 360 (for example, the API 145) is, for example, a set of API programming functions, which may be configured differently according to an OS. For example, in the case of Android or iOS, one API set may be provided per platform, whereas in the case of Tizen, two or more API sets may be provided per platform.

The applications 370 (for example, the application programs 147) includes, for example, one or more applications capable of providing functions such as home 371, dialer 372, short message service/multimedia messaging service (SMS/MMS) 373, Instant message (IM) 374, browser 375, camera 376, alarm 377, contacts 378, voice dial 379, email 380, calendar 381, media player 382, album 383, or clock 384, health care (for example, measurement of an exercise amount or a glucose level), or providing of environment information (for example, information about atmospheric pressure, humidity, or temperature).

According to an embodiment of the present disclosure, the applications 370 may include an information exchange application supporting information exchange between the electronic device 101 and the electronic device 102 or 104. The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device 102 or 104. Also, the notification relay application may, for example, receive notification information from the external electronic device and transmit the received notification information to a user.

The device management application may, for example, manage (for example, install, delete, or update) at least a part of functions of the external electronic device 102 or 104 communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment of the present disclosure, the applications 370 may include an application (for example, a health care application of a mobile medical equipment) designated according to a property of the external electronic device 102 or 104. The applications 370 may include an application received from the server 106 or the electronic device 102 or 104. The applications 370 may include a preloaded application or a third party application downloadable from a server. The names of components of the programming module 310 may vary according to the type of an OS.

According to an embodiment of the present disclosure, at least a part of the programming module 310 may be implemented in software, firmware, hardware, or a combination of at least two of them. At least a part of the programming module 310 may be implemented (for example, executed) by the processor (for example, the processor 210). At least a part of the programming module 310 may include, for example, a module, a program, a routine, a set of instructions, or a process to execute one or more functions.

Figure 4:
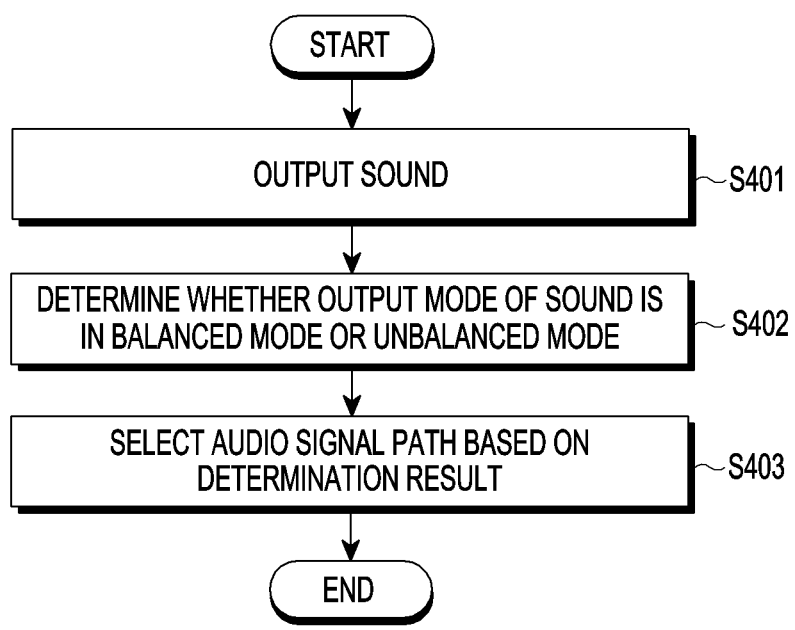
FIG. 4 is a flowchart illustrating an audio output method according to an embodiment of the present disclosure.

FIG. 4 is a flowchart illustrating an audio output method according to an embodiment of the present disclosure.

Referring to FIG. 4, an audio accessory (for example, the earphone 286) may output a sound received from an external electronic device (for example, the electronic device 101) in step S401.

For example, an ear jack connector (for example, a 4-pole ear jack connector) included in the audio accessory 286 may receive a signal from the external electronic device 101.

For example, the audio accessory 286 may include at least a left (L) output unit and a right (R) output unit, and output signals through the L and R output units based on a signal received from the external electronic device. For example, the L output unit and R output unit of the audio accessory 286 may be configured to output an L signal and an R signal, respectively.

For example, the received signal may include a sound (or an audio signal) generated from the external electronic device 101.

For example, the external electronic device 101 may be an electronic device (for example, a smartphone) which may generate a signal (for example, an audio signal), transmit the generated signal to the audio accessory 286, and control the signal to be output through the audio accessory 286.

For example, the ear jack connector (for example, a 4-pole ear jack connector) may be configured to connect the external electronic device 101 electrically to the audio accessory 286. For example, the ear jack connector may include at least one port (for example, an L port, an R port, a G port, or an M port). For example, the L port may be configured to receive an L signal from the external electronic device 101. For example, the R port may be configured to receive an R signal from the external electronic device 101. For example, the G port may be a ground port with respect to the L port and the R port. For example, the M port may be configured to receive an M signal (for example, a voice signal of a user) received through an external microphone (for example, the microphone 288).

In step S402, according to an embodiment of the present disclosure, a processor included in the audio accessory 286 may determine whether the output mode of the sound through an audio output unit is a balanced mode or an unbalanced mode.

For example, the audio accessory 286 may include an ear jack connector with first to fourth ports connected to the audio output unit through a first sound output path and a second sound output path, and the processor may be configured to electrically connect at least one of the first to fourth ports of the ear jack connector to the audio output unit by means of a switching unit.

For example, the unbalanced mode may be a sound output mode in which an audio signal is received from the external electronic device in the form of an unbalanced signal, the audio accessory switches at least one port to the L, R, G, and M ports and outputs the unbalanced signal through the at least one switched port.

For example, the balanced mode may be a sound output mode in which an audio signal is received from the external electronic device in the form of a balanced signal, the audio accessory switches at least one port to the L+, R+, L−, and R− ports and outputs the balanced signal through the at least one switched port.

For example, the switching unit included in the audio accessory 286 may switch at least one port for the ear jack connector according to an output mode of sound under the control of the processor.

According to an embodiment of the present disclosure, the switching unit may switch at least one port for the ear jack connector (for example, a 4-pole ear jack connector) so as to change the polarity of at least one of the ports included in the ear jack connector (for example, the L, R, G, and M ports). For example, the switching unit may switch at least one port for the ear jack connector so that the L port included in the ear jack connector may receive not an L signal but an L+ signal. For example, the switching unit may switch at least one port for the ear jack connector so that the R port included in the ear jack connector may receive not an R signal but an L− signal. For example, the switching unit may switch at least one port for the ear jack connector so that the G port included in the ear jack connector may receive an R+ signal. For example, the switching unit may switch at least one port for the ear jack connector so that the M port included in the ear jack connector may receive not an M signal but an R− signal.

For example, the L+ signal and the L− signal may be signals for outputting a balanced signal through the left output unit of the audio accessory 286, and the R+ signal and the R− signal may be signals for outputting a balanced signal through the right output unit of the audio accessory 286.

According to an embodiment of the present disclosure, the switching unit may be configured to change a signal propagation path between the ear jack connector and the left and right output units in order to change the polarity of at least one port included in the ear jack connector.

According to an embodiment of the present disclosure, the processor may select a sound signal path according to the determination result in step S403.

For example, the processor may switch at least one port through the switching unit based on a result of determination as to whether the output mode of sound is the balanced mode or the unbalanced mode.

For example, at least one audio output unit included in the audio accessory 286 may output a signal received through the ear jack connector with at least one port switched.

For example, the left output unit of the audio accessory 286 may be configured to output the L signal, or the L+ signal and the L− signal received through the ear jack connector with at least one port switched. For example, the right output unit of the audio accessory 286 may be configured to output the R signal, or the R+ signal and the R− signal received through the ear jack connector with at least one port switched.

Figure 5:
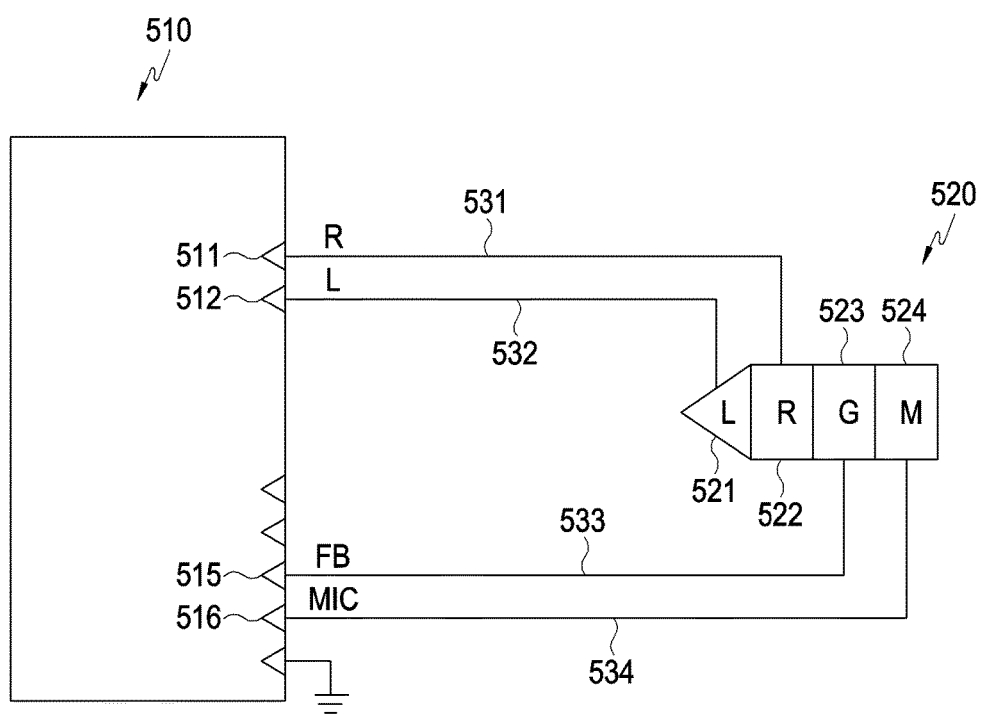
FIG. 5 is a block diagram illustrating an ear jack connector switched to output an unbalanced signal, and an external electronic device according to an embodiment of the present disclosure.

FIG. 5 is a block diagram illustrating an ear jack connector switched to output an unbalanced signal, and an external electronic device according to an embodiment of the present disclosure.

Referring to FIG. 5, for example, an external electronic device 510 includes a first output port 511 for transmitting an R signal of an unbalanced signal to the ear jack connector 520 (for example, a 4-pole ear jack connector), a second output port 512 for transmitting an L signal of the unbalanced signal to the ear jack connector 520 (for example, a 4-pole ear jack connector), a third output port 515 being a feedback (FB) port for grounding the R signal and the L signal of the unbalanced signal, and a fourth output port 516 for transmitting a microphone (MIC) signal of the unbalanced signal to the ear jack connector 520 (for example, a 4-pole ear jack connector).

According to an embodiment of the present disclosure, the ear jack connector 520 includes an L port 521 for receiving the L signal of the unbalanced signal from the second output port 512 through a second output circuit 532, an R port 522 for receiving the R signal of the unbalanced signal from the first output port 511 through a first output circuit 531, a G port 523 being an FB port configured to be grounded during reception of the unbalanced signal, and an M port 524 for receiving the MIC signal of the unbalanced signal through a fourth output circuit 534.

Figure 6:
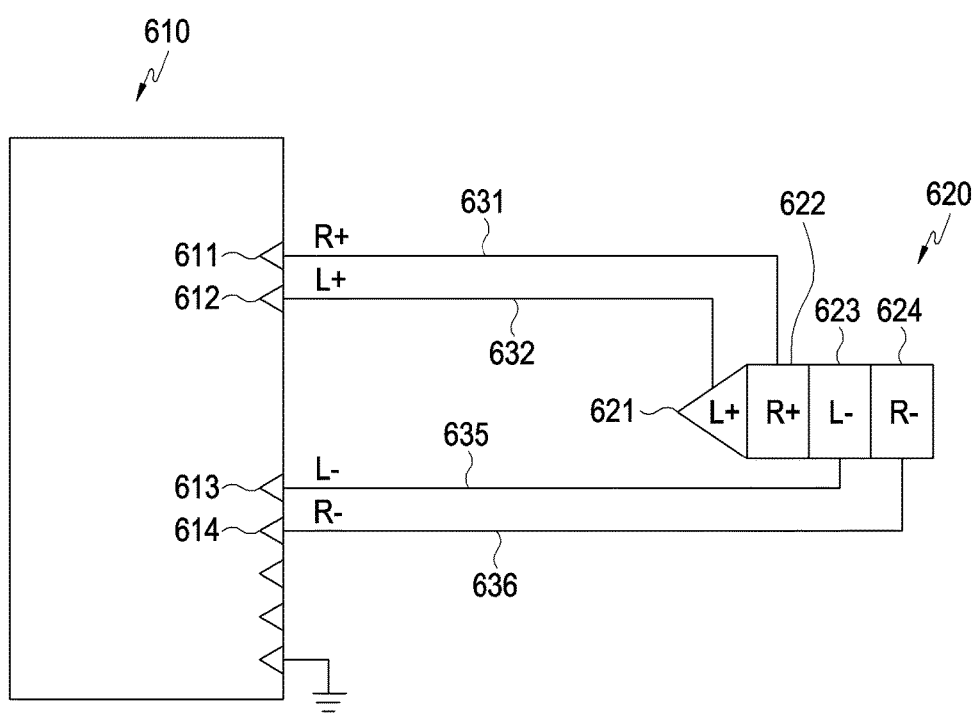
FIG. 6 is a block diagram illustrating an ear jack connector switched to output a balanced signal, and an external electronic device according to an embodiment of the present disclosure.

FIG. 6 is a block diagram illustrating an ear jack connector switched to output a balanced signal, and an external electronic device according to an embodiment of the present disclosure.

Referring to FIG. 6, for example, according to an embodiment of the present disclosure, an ear jack connector 620 (for example, a 4-pole ear jack connector) includes an L+ port 621 for receiving an L+ signal of a balanced signal from a second output port 612 through a second output circuit 632, an R+ port 622 for receiving an R+ signal of the balanced signal from a first output port 611 through a first output circuit 631, an L− port 623 for receiving an L− signal of the balanced signal from a fifth output port 613 through a fifth output circuit 635, and an R− port 624 for receiving an R− signal of the balanced signal from a fourth output port 614 through a sixth output circuit 636.

According to an embodiment of the present disclosure, a switching unit included in an audio accessory 286 may include a detachable microphone. It may be configured that at least one port of the ear jack connector 620 is switched according to detachment or attachment of the microphone. An external electronic device 101 may recognize the detachment or attachment of the microphone according to the switching, and transmit a balanced signal including L+, R+, L−, and R− signals instead of an unbalanced signal including L, R, and MIC signals to the ear jack connector 620 in response to the detachment of the microphone.

Figure 7A:
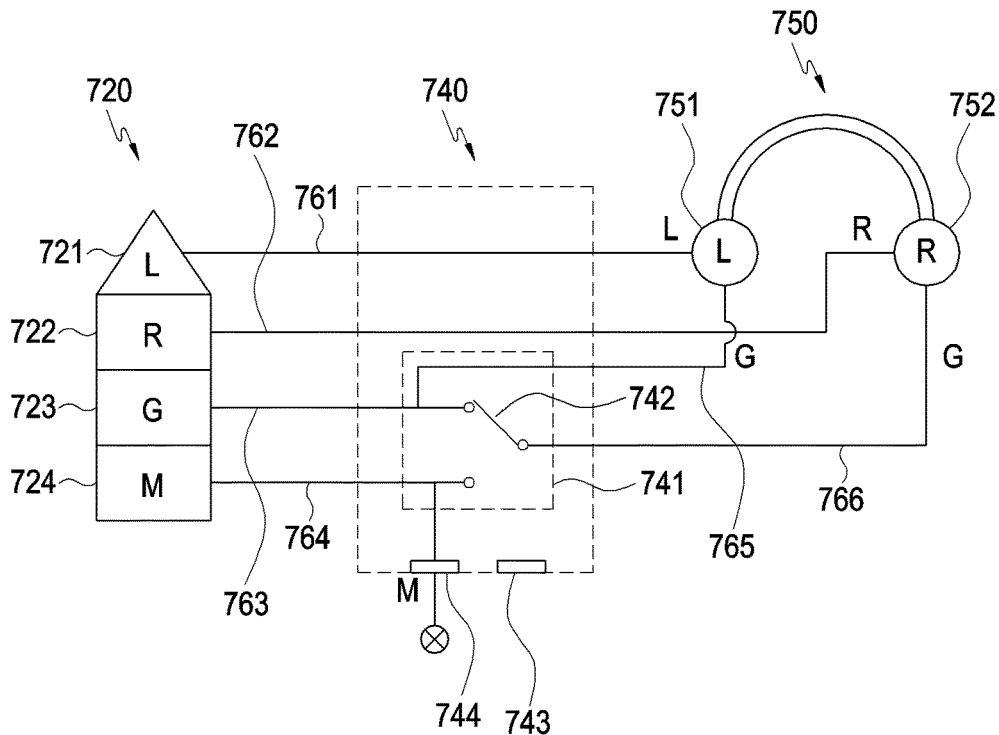
FIG. 7A is a circuit diagram illustrating an audio accessory switched to output an unbalanced signal according to an embodiment of the present disclosure.

FIG. 7A is a circuit diagram illustrating an audio accessory switched to output an unbalanced signal according to another embodiment of the present disclosure.

Referring to FIG. 7A, according to an embodiment of the present disclosure, a switching unit 740 includes a switching module 741, a microphone module 744, and an external switching module 743. For example, the switching module 741 may be configured to connect a third transmission circuit 763 to a first reception circuit 765 and a second reception circuit 766 according to operation of the microphone module 744 or the external switching module 743. For example, as illustrated in FIG. 7A, when the microphone module 744 is attached to the switching unit 740, the switching module 741 may be configured to connect the third transmission circuit 763 to the first reception circuit 765 and the second reception circuit 766, and the external electronic device 101 may be configured to transmit an unbalanced signal to the audio accessory 286 in response to the switching.

According to an embodiment, an L port 721 of an ear jack connector 720 (for example, a 4-pole ear jack connector) may transmit an L signal of the unbalanced signal received from the external electronic device 101 to a first output unit (an L output unit) 751 of an output unit 750 through a first transmission circuit 761, an R port 722 of the ear jack connector 720 may transmit an R signal of the unbalanced signal received from the external electronic device to the second output unit (R output unit) 752 of the output unit 750 through a second transmission circuit 762, and a G port 723 may be connected to the first output unit 751 through the third transmission circuit 763 and the first reception circuit 765 and to the second output unit 752 through the third transmission circuit 763 and the second reception circuit 766 according to switching or non-switching.

For example, the first output unit 751 of the output unit 750 may be configured to output the L signal of the unbalanced signal received from the L port 721, and the second output unit 752 of the output unit 750 may be configured to output the R signal of the unbalanced signal received from the R port 722.

Figure 7B:
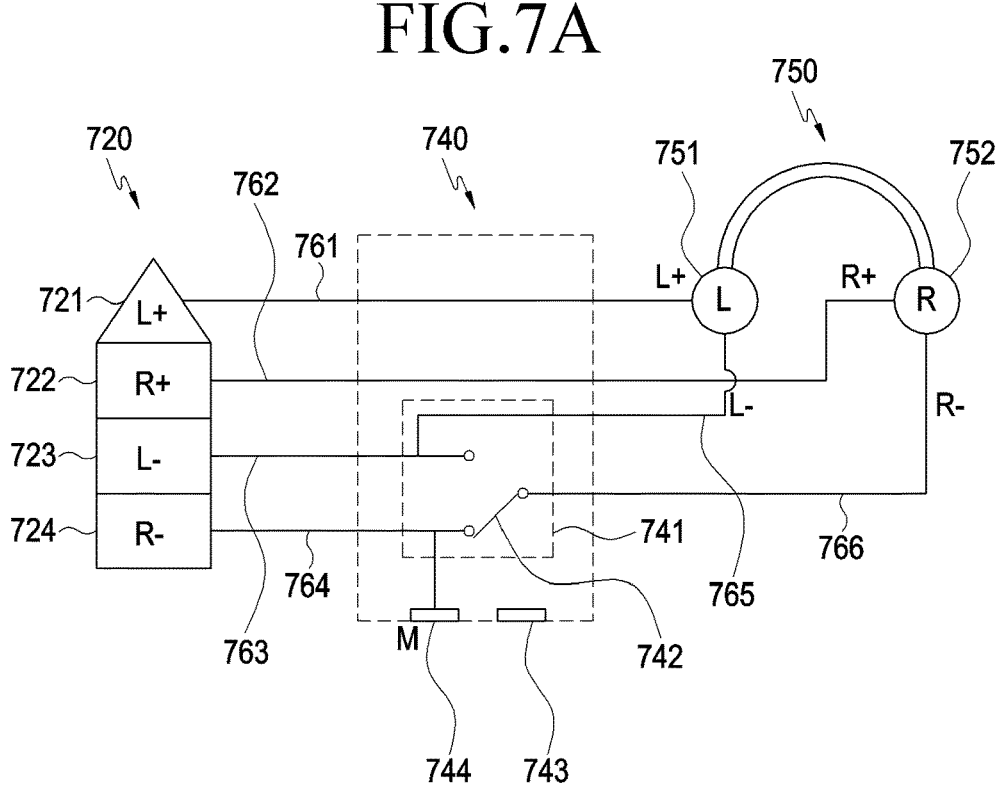
FIG. 7B is a circuit diagram illustrating an audio accessory switched to output a balanced signal according to an embodiment of the present disclosure.

FIG. 7B is a circuit diagram illustrating an audio accessory switched to output a balanced signal according to another embodiment of the present disclosure.

Referring to FIG. 7B, according to an embodiment of the present disclosure, the switching module 741 may be configured to connect the third transmission circuit 763 to the first reception circuit 765 and connect the fourth transmission circuit 764 to the second reception circuit 766 according to operation of the microphone module 744 or the external switching module 743. The switching unit 740 may be configured to connect the third transmission circuit 763 to the first reception circuit 765 and connect the fourth transmission circuit 764 to the second reception circuit 766 in response to detachment of the microphone module 744. The external electronic device 101 may be configured to transmit a balanced signal instead of an unbalanced signal to the audio accessory 286 in response to the detachment of the microphone module 744.

According to an embodiment of the present disclosure, the L+ port 721 of the ear jack connector 720 may transmit an L+ signal of the balanced signal received through the external electronic device 101 to the first output unit (L output unit) 751 through a first transmission circuit 761, the R+ port 722 may transmit an R+ signal of the balanced signal received through the external electronic device 101 to the second output unit (R output unit) 752 through a second transmission circuit 762, the L− port 723 may transmit an L− signal of the balanced signal to the first output unit 751 through the third transmission circuit 763 and the first reception circuit 765, and an R− port 724 may transmit an R− signal of the balanced signal to the second output unit 752 through the fourth transmission circuit 764 and the second reception circuit 766.

For example, the first output unit 751 of the output unit 750 may be configured to output the L+ signal of the balanced signal received from the L+ port 721 and the L− signal of the balanced signal received from the L− port 723. The second output unit 752 may be configured to output the R+ signal of the balanced signal received from the R+ port 722 and the R− signal of the balanced signal received from the R− port 724.

Figure 8A:
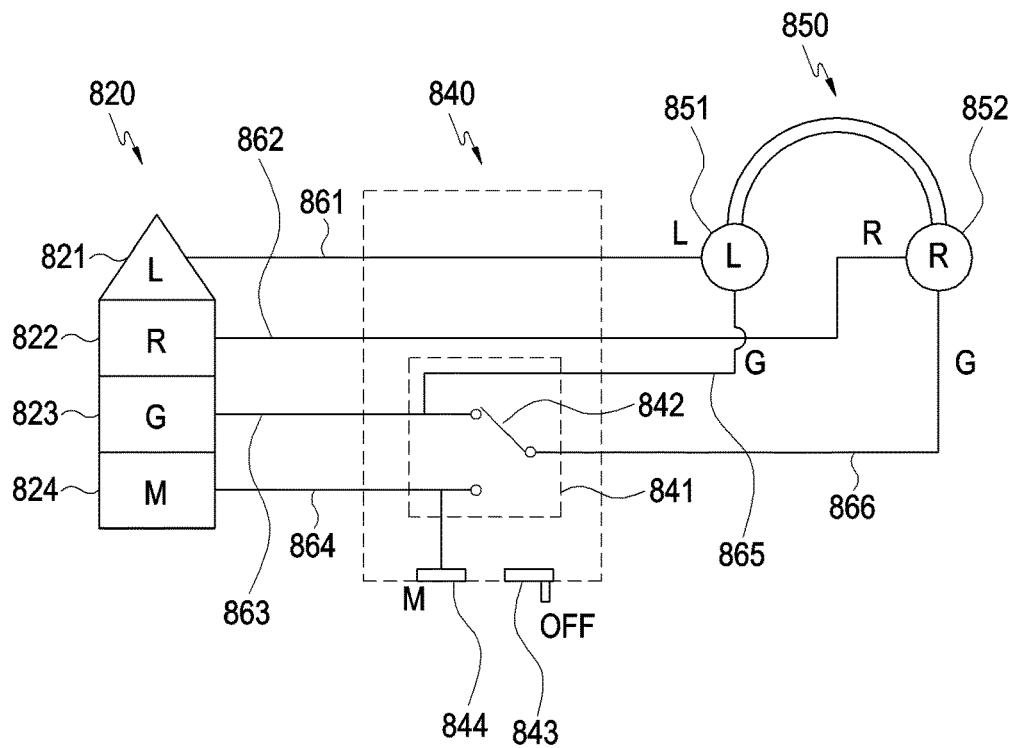
FIG. 8A is a circuit diagram illustrating an audio accessory switched to output an unbalanced signal according to another embodiment of the present disclosure.

FIG. 8A is a circuit diagram illustrating an audio accessory switched to output an unbalanced signal according to another embodiment of the present disclosure.

Referring to FIG. 8A, according to an embodiment of the present disclosure, a switching module 841 may be configured to connect a third transmission circuit 863 to a first reception circuit 865 and a second reception circuit 866 according to operation of a microphone module 844 or an external switching module 843. For example, as illustrated in FIG. 8A, if the external switching module 843 is set to an OFF state, the switching module 841 may be configured to connect the third transmission circuit 863 and the second reception circuit 866 to the first reception circuit 865, and the external electronic device 101 may be configured to transmit an unbalanced signal to an audio accessory 286 in response to the switching.

According to an embodiment of the present disclosure, an L port 821 of an ear jack connector 820 (for example, a 4-pole ear jack connector) may transmit an L signal of the unbalanced signal received through the external electronic device 101 to a first output unit 851 through a first transmission circuit 861, an R port 822 may transmit an R signal of the unbalanced signal to a second output unit 852 through a second transmission circuit 862, and a G port 823 may be connected to the first output unit 851 through the third transmission circuit 863 and the first reception circuit 865 or to the second output unit 852 through the third transmission circuit 863 and the second reception circuit 866, according to switching or non-switching.

For example, the first output unit 851 of an output unit 850 may be configured to output the L signal of the unbalanced signal received from the L port 821, and the second output unit 852 may be configured to output the R signal of the unbalanced signal received from the R port 822.

Figure 8B:
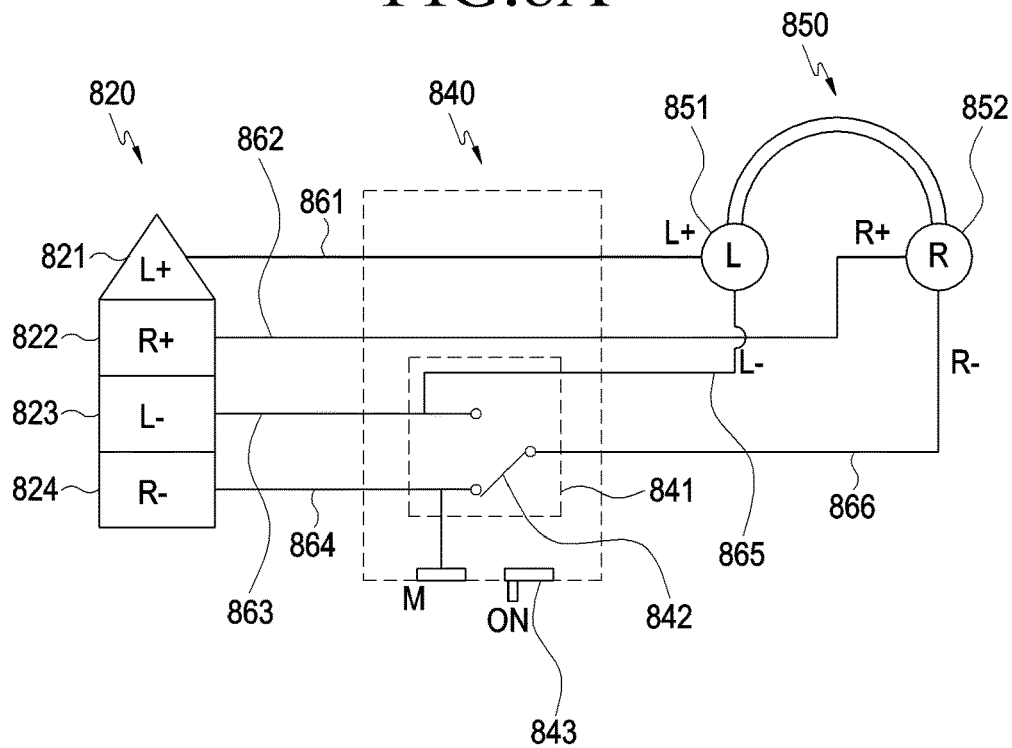
FIG. 8B is a circuit diagram illustrating an audio accessory switched to output a balanced signal according to another embodiment of the present disclosure.

FIG. 8B is a circuit diagram illustrating an audio accessory switched to output a balanced signal according to another embodiment of the present disclosure.

Referring to FIG. 8B, according to an embodiment of the present disclosure, a switching unit 840 may be configured to connect the third transmission circuit 863 to the first reception circuit 865 and connect a fourth transmission circuit 864 to the second reception circuit 866, according to operation of the external switching module 843. The external electronic device 101 may be configured to transmit a balanced signal instead of an unbalanced signal to the audio accessory 286 in response to the state of the external switching module 843.

According to an embodiment of the present disclosure, the L+ port 821 of the ear jack connector 820 may transmit an L+ signal of the balanced signal received through the external electronic device 101 to the first output unit 851 through the first transmission circuit 861, the R+ port 822 may transmit an R+ signal of the balanced signal received through the external electronic device 101 to the second output unit 852 through the second transmission circuit 862, the L− port 823 may transmit an L− signal of the balanced signal received through the external electronic device 101 to the first output unit 851 through the third transmission circuit 863 and the first reception circuit 865, and an R− port 824 may transmit an R− signal of the balanced signal received through the external electronic device 101 to the second output unit 852 through the fourth transmission circuit 864 and the second reception circuit 866.

For example, the first output unit 851 of the output unit 850 may be configured to output the L+ signal of the balanced signal received from the L+ port 821 and the L− signal of the balanced signal received from the L− port 823. The second output unit 852 may be configured to output the R+ signal of the balanced signal received from the R+ port 822 and the R− signal of the balanced signal received from the R− port 824.

Figure 9A:
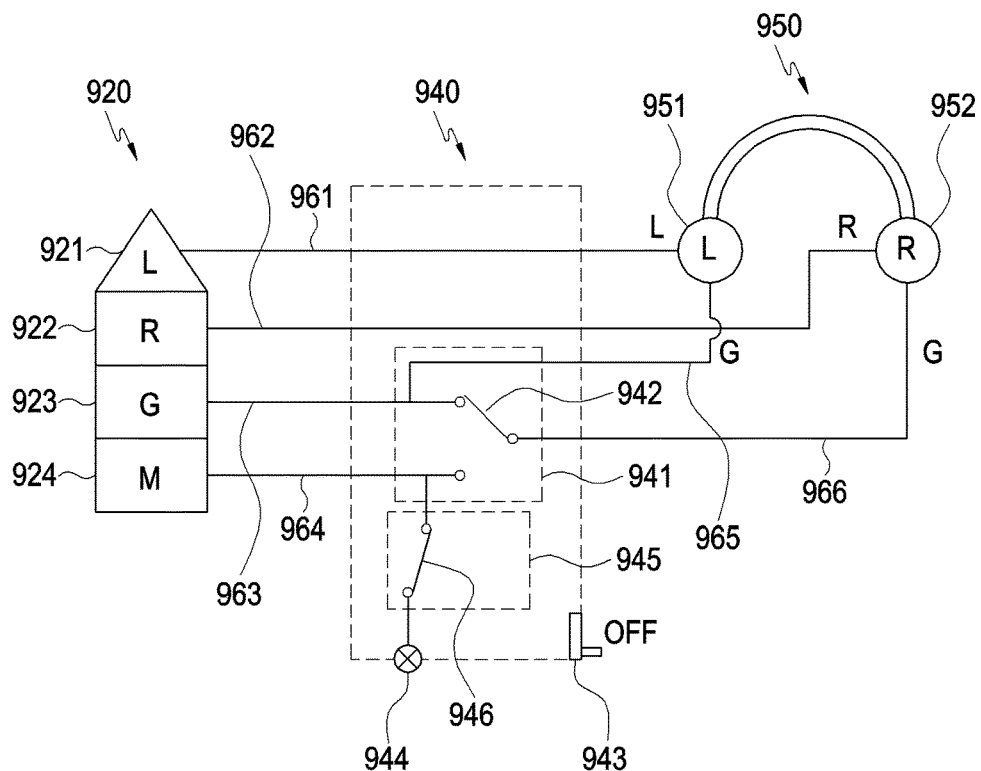
FIG. 9A is a circuit diagram illustrating an audio accessory switched to output an unbalanced signal according to another embodiment of the present disclosure.

FIG. 9A is a circuit diagram illustrating an audio accessory switched to output an unbalanced signal according to another embodiment of the present disclosure.

Referring to FIG. 9A, according to an embodiment of the present disclosure, a switching unit 940 includes a first switching module 941, a second switching module 945, a microphone module 944, and an external switching module 943. The first switching module 941 may be configured to connect a third transmission circuit 963 to a first reception circuit 965 and a second reception circuit 966 according to operation of the external switching module 943. The second switching module 945 may be configured to connect a fourth transmission circuit 964 to the microphone module 944 according to operation of the external switching module 943.

For example, as illustrated in FIG. 9A, if the external switching module 943 is set to an OFF state, the first switching module 941 may be configured to connect the third transmission circuit 963 to the first reception circuit 965 and the second reception circuit 966, and the second switching module 945 may be configured to connect the fourth transmission circuit 964 to the microphone module 944 according to operation of the external switching module 943. The external electronic device 101 may be configured to transmit an unbalanced signal to an audio accessory 286 in response to the switching.

According to an embodiment of the present disclosure, an L port 921 of an ear jack connector 920 (for example, a 4-pole ear jack connector) may transmit an L signal of the unbalanced signal received through the external electronic device 101 to a first output unit (L output unit) 951 through a first transmission circuit 961, an R port 922 may transmit an R signal of the unbalanced signal received through the external electronic device 101 to a second output unit (R output unit) 952 through a second transmission circuit 962, a G port 923 may be connected to the first output unit 951 through the third transmission circuit 963 and the first reception circuit 965 or to the second output unit 952 through the third transmission circuit 963 and the second reception circuit 966, according to switching or non-switching, and an M port 924 may receive a microphone signal from the microphone module 944 through the fourth transmission circuit 964.

For example, the first output unit 951 may be configured to output the L signal of the unbalanced signal received from the L port 921, and the second output unit 952 may be configured to output the R signal of the unbalanced signal received from the R port 922.

Figure 9B:
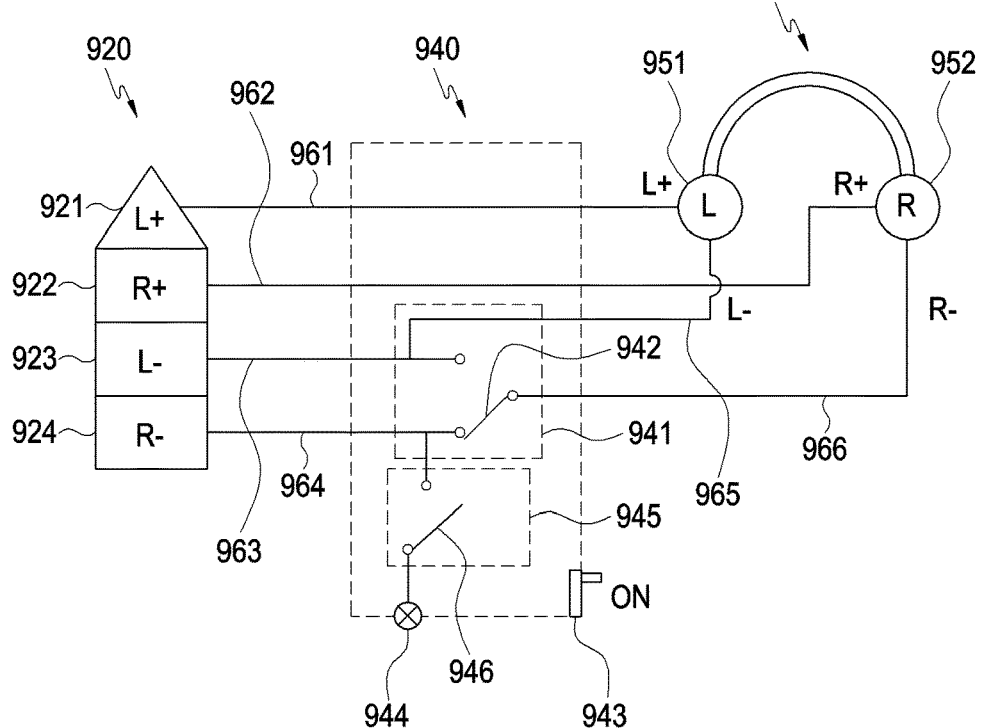
FIG. 9B is a circuit diagram illustrating an audio accessory switched to output a balanced signal according to another embodiment of the present disclosure.

FIG. 9B is a circuit diagram illustrating an audio accessory switched to output a balanced signal according to an embodiment of the present disclosure.

Referring to FIG. 9B, according to an embodiment of the present disclosure, the switching unit 940 may be configured to connect the third transmission circuit 963 to the first reception circuit 965 and connect the fourth transmission circuit 964 to the second reception circuit 966, according to a state of the external switching module 943. The external electronic device 101 may be configured to transmit a balanced signal instead of an unbalanced signal to the audio accessory 286 in response to the state of the external switching module 943.

According to an embodiment of the present disclosure, the L+ port 921 of the ear jack connector 920 may transmit an L+ signal of the balanced signal received through the external electronic device 101 to the first output unit 951 through the first transmission circuit 961, the R+ port 922 may transmit an R+ signal of the balanced signal received through the external electronic device 101 to the second output unit 952 through the second transmission circuit 962, the L− port 923 may transmit an L− signal of the balanced signal received through the external electronic device 101 to the first output unit 951 through the third transmission circuit 963 and the first reception circuit 965, and the R− port 924 may transmit an R− signal of the balanced signal received through the external electronic device 101 to the second output unit 952 through the fourth transmission circuit 964 and the second reception circuit 966.

For example, the first output unit 951 of the output unit 950 may be configured to output the L+ signal of the balanced signal received from the L+ port 921 and the L-signal of the balanced signal received from the L− port 923. The second output unit 952 may be configured to output the R+ signal of the balanced signal received from the R+ port 922 and the R− signal of the balanced signal received from the R− port 924.

Figure 10:
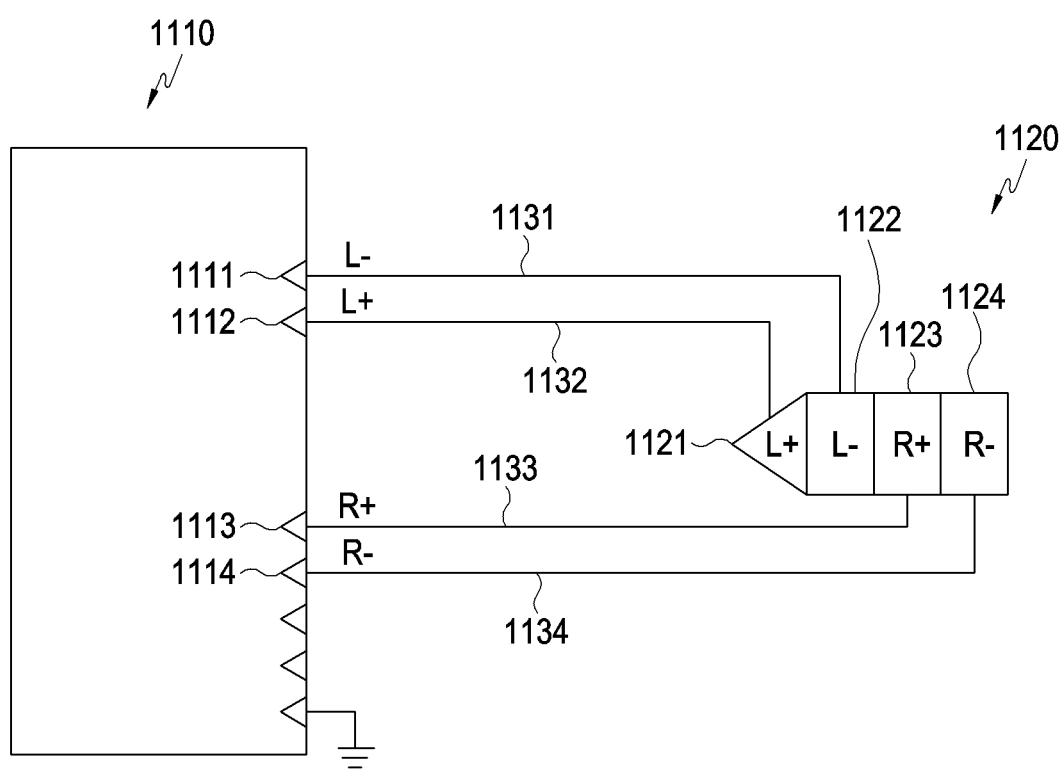
FIG. 10 is a block diagram illustrating another ear jack connector switched to output a balanced signal, and an external electronic device according to an embodiment of the present disclosure.

FIG. 10 is a block diagram illustrating another ear jack connector switched to output a balanced signal, and an external electronic device according to an embodiment of the present disclosure.

Referring to FIG. 10, for example, according to an embodiment of the present disclosure, an ear jack connector 1120 (for example, a 4-pole ear jack connector) includes an L+ port 1121 for receiving an L+ signal of a balanced signal from a second output port 1112 through a second output circuit 1132, an L− port 1122 for receiving an L− signal of the balanced signal from a first output port 1111 through a first output circuit 1131, an R+ port 1123 for receiving an R+ signal of the balanced signal from a fifth output port 1113 through a fifth output circuit 1135, and an R− port 1124 for receiving an R− signal of the balanced signal from a fourth output port 1114 through a sixth output circuit 1136.

According to an embodiment of the present disclosure, a switching unit included in the audio accessory 286 may include at least one detachable microphone. It may be configured that at least one port of the ear jack connector 1120 is switched according to detachment or attachment of the microphone. The external electronic device 101 may recognize the detachment or attachment of the microphone according to the switching, and transmit a balanced signal including L+, L−, R+, and R− signals instead of an unbalanced signal including L, R, and MIC signals to the ear jack connector 1120 through the first to fourth output ports and the first to fourth output circuits in response to the detachment of the microphone.

Figure 11A:
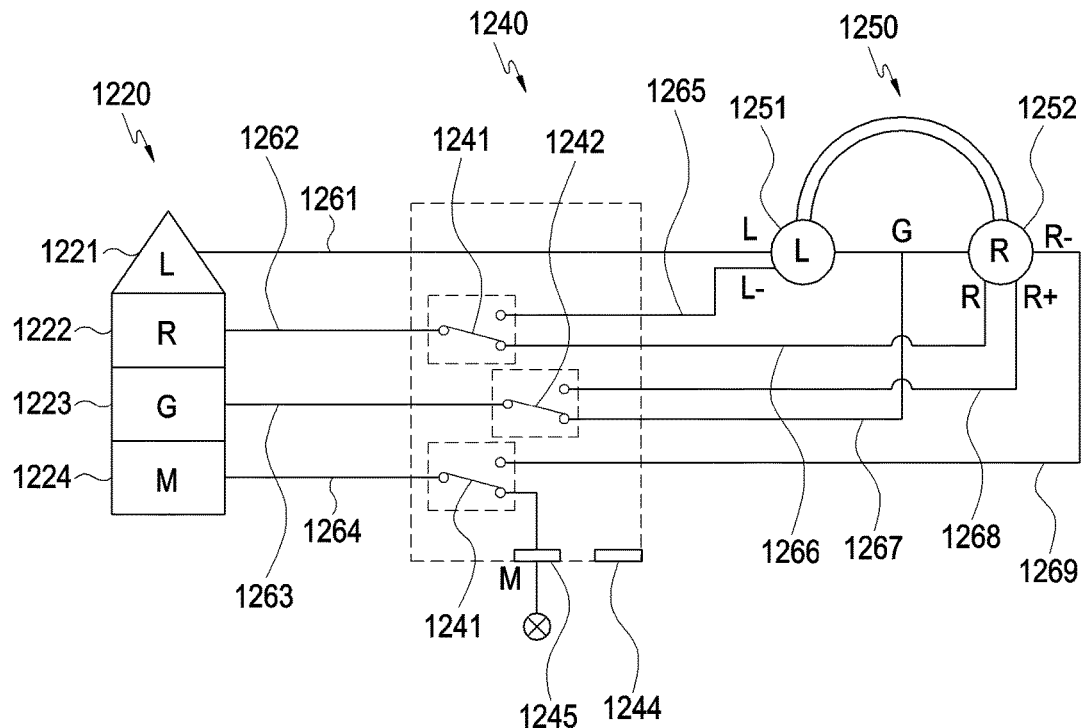
FIG. 11A is a circuit diagram illustrating an audio accessory switched to output an unbalanced signal according to another embodiment of the present disclosure.

FIG. 11A is a circuit diagram illustrating an audio accessory switched to output an unbalanced signal according to another embodiment of the present disclosure.

Referring to FIG. 11A, according to an embodiment of the present disclosure, a switching unit 1240 includes a first switching module 1241, a second switching module 1242, a third switching module 1243, a microphone module 1245, and an external switching module 1244. The first, second, and third switching modules 1241, 1242, and 1243 may be changed according to a switching state of the microphone module 1245 or the external switching module 1244.

Along with attachment of the microphone module 1245, for example, the first switching module 1241 may be configured to connect a second transmission circuit 1262 to a second reception circuit 1266, the second switching module 1242 may be configured to connect a third transmission circuit 1263 to a fourth reception circuit 1267, and the third switching module 1243 may be configured to connect a fourth transmission circuit 1264 to the microphone module 1245.

For example, the external electronic device 101 may be configured to transmit an unbalanced signal to the audio accessory 286 in response to the above operation along with the attachment of the microphone module 1245.

According to an embodiment of the present disclosure, as the microphone module 1245 is attached, an L port 1221 of an ear jack connector 1220 (for example, a 4-pole ear jack connector) may transmit an L signal of the unbalanced signal received through the external electronic device 101 to a first output unit (L output unit) 1251 through a first transmission circuit 1261, an R port 1222 may transmit an R signal of the unbalanced signal to a second output unit (R output unit) 1252 through the second transmission circuit 1262 and the second reception circuit 1266, a G port 1223 may be connected to the first output unit 1251 and the second output unit 1252 through the third transmission circuit 1263 and the fourth reception circuit 1267, and an M port 1224 may receive a MIC signal from the microphone module 1245 through the fourth transmission circuit 1264.

For example, as the microphone module 1245 is attached, the first output unit 1251 may be configured to output the L signal of the unbalanced signal received from the L port 1221, and the second output unit 1252 may be configured to output the R signal of the unbalanced signal received from the R port 1222.

Figure 11B:
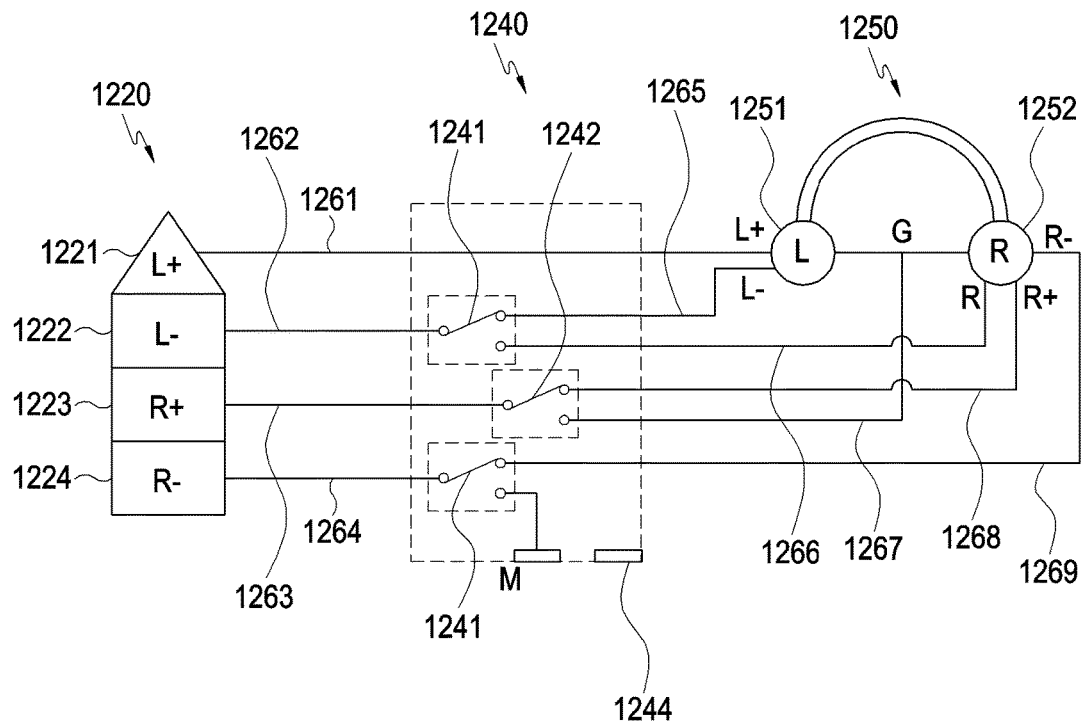
FIG. 11B is a circuit diagram illustrating an audio accessory switched to output a balanced signal according to another embodiment of the present disclosure.

FIG. 11B is a circuit diagram illustrating an audio accessory switched to output a balanced signal according to another embodiment of the present disclosure.

Referring to FIG. 11B, according to an embodiment of the present disclosurein response to detachment of the microphone module 1245, the first switching module 1241 may be configured to connect the second transmission circuit 1262 to a first reception circuit 1265, the second switching module 1242 may be configured to connect the third transmission circuit 1263 to the third reception circuit 1268, and the third switching module 1243 may be configured to connect the fourth transmission circuit 1264 to a fifth reception circuit 1269.

For example, the external electronic device 101 may be configured to transmit a balanced signal instead of an unbalanced signal to the audio accessory 286 in response to the detachment of the microphone module 1245.

According to an embodiment of the present disclosure, the L+ port 1221 of the ear jack connector 1220 may transmit an L+ signal of the balanced signal received through the external electronic device 101 to the first output unit 1251 through the second transmission circuit 1262 and the first reception circuit 1265, the L− port 1222 may transmit an L− signal to the first output unit 1251 through the second transmission circuit 1262 and the first reception circuit 1265, the R+ port 1223 may transmit an R+ signal to the second output unit 1252 through the third transmission circuit 1263 and a third reception circuit 1268, and the R− port 1224 may transmit an R− signal to the second output unit 1252 through the fourth transmission circuit 1264 and the fifth reception circuit 1269.

For example, the first output unit 1251 of an output unit 1250 may be configured to output the L+ signal of the balanced signal received from the L+ port 1221 and the L-signal of the balanced signal received from the L− port 1222. The second output unit 1252 may be configured to output the R+ signal of the balanced signal received from the R+ port 1223 and the R− signal of the balanced signal received from the R-port 1224.

Figure 12A:
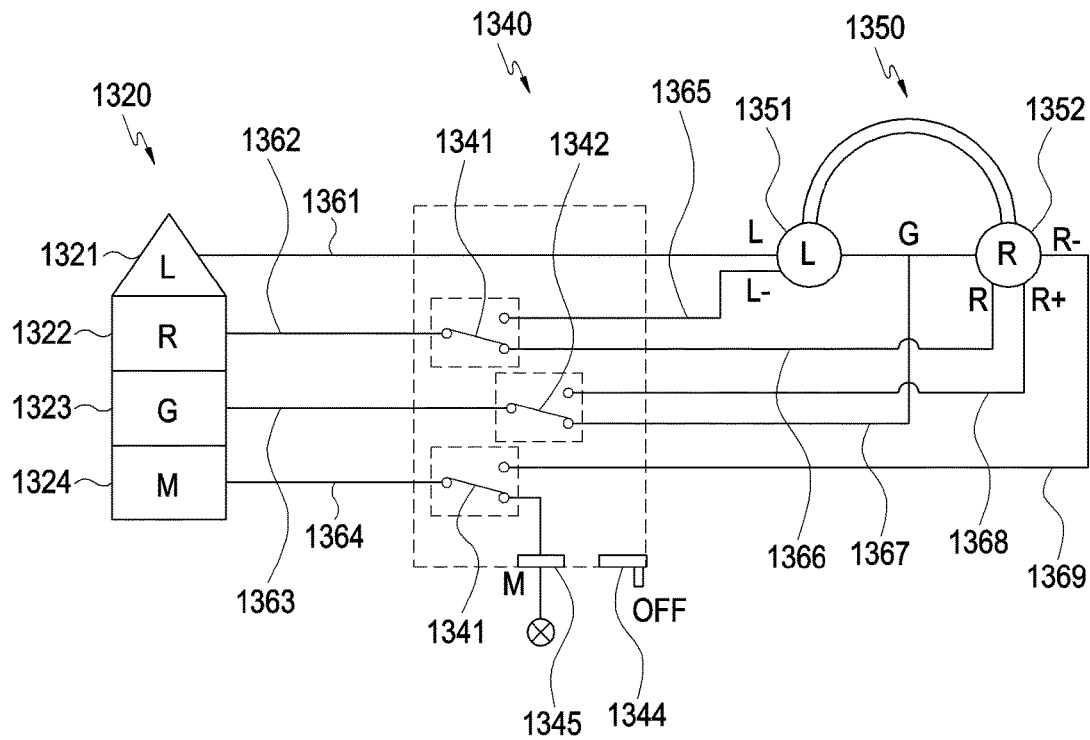
FIG. 12A is a circuit diagram illustrating an audio accessory switched to output an unbalanced signal according to another embodiment of the present disclosure.

FIG. 12A is a circuit diagram illustrating an audio accessory switched to output an unbalanced signal according to an embodiment of the present disclosure.

Referring to FIG. 12A, for example, if an external switching module 1344 is set to an OFF state with a microphone module 1345 attached, a first switching module 1341 may be configured to connect a second transmission circuit 1362 to a second reception circuit 1366 to the first reception circuit 866, a second switching module 1342 may be configured to connect a third transmission circuit 1363 to a fourth reception circuit 1367, and a third switching module 1343 may be configured to connect a fourth transmission circuit 1364 to the microphone module 1345.

For example, as the external switching module 1344 is set to the OFF state with the microphone module 1345 attached, the external electronic device 101 may be configured to transmit an unbalanced signal to the audio accessory 286.

According to an embodiment of the present disclosure, as the external switching module 1344 is set to the OFF state with the microphone module 1345 attached, an L port 1321 of an ear jack connector 1320 (for example, a 4-pole ear jack connector) may transmit an L signal of the unbalanced signal received through the external electronic device 101 to a first output unit 1351 through a first transmission circuit 1361, an R port 1322 may transmit an R signal of the unbalanced signal received through the external electronic device 101 to a second output unit 1352 through the second transmission circuit 1362 and the second reception circuit 1366, and a G port 1323 may be connected to the first output unit 1351 and the second output unit 1352 through the third transmission circuit 1363 and the fourth reception circuit 1367, and an M port 1324 may receive a MIC signal from the microphone module 1345 through the fourth transmission circuit 1364.

For example, as the external switching module 1344 is set to the OFF state with the microphone module 1345 attached, the first output unit 1351 may be configured to output the L signal of the unbalanced signal received from the L port 1321, and the second output unit 1352 may be configured to output the R signal of the unbalanced signal received from the R port 1322.

Figure 12B:
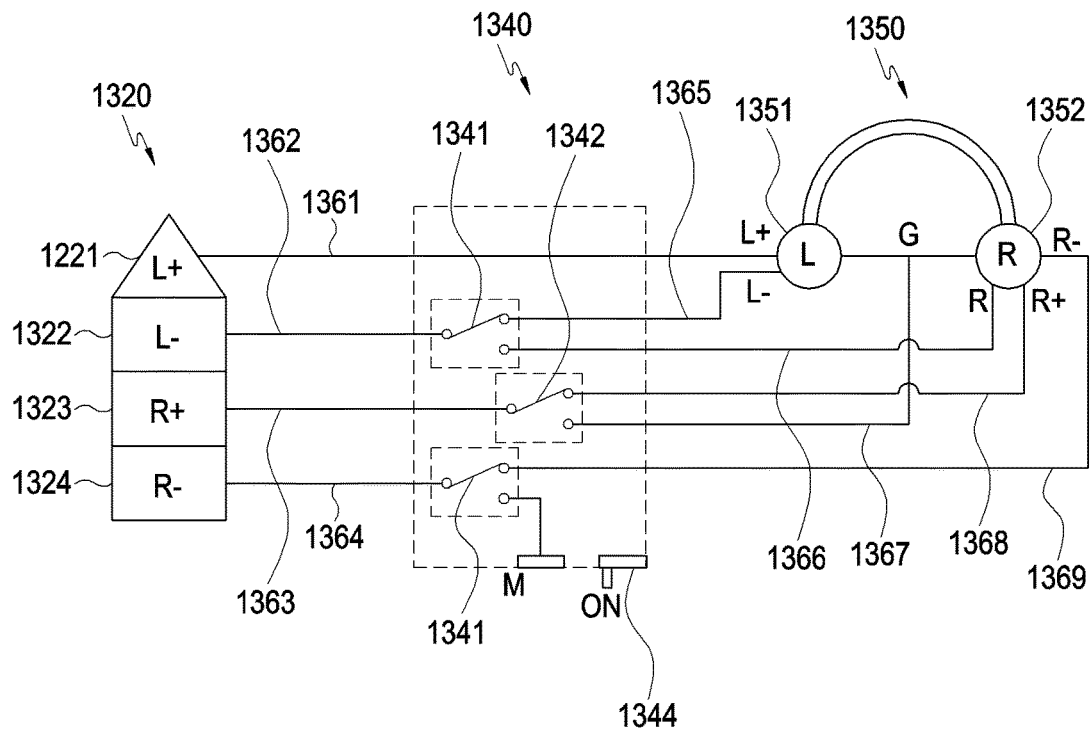
FIG. 12B is a circuit diagram illustrating an audio accessory switched to output a balanced signal according to another embodiment of the present disclosure.

FIG. 12B is a circuit diagram illustrating an audio accessory switched to output a balanced signal according to another embodiment of the present disclosure.

Referring to FIG. 12B, according to an embodiment of the present disclosure, as the external switching module 1344 is set to an ON state with the microphone module 1345 detached, the first switching module 1341 may be configured to connect the second transmission circuit 1362 to a first reception circuit 1365, the second switching module 1342 may be configured to connect the third transmission circuit 1363 to a third reception circuit 1368, and the third switching module 1343 may be configured to connect the fourth transmission circuit 1364 to a fifth reception circuit 1369.

As the external switching module 1344 is set to the ON state with the microphone module 1345 detached, the external electronic device 101 may be configured to transmit a balanced signal instead of an unbalanced signal to the audio accessory 286.

According to an embodiment of the present disclosure, as the external switching module 1344 is set to the ON state with the microphone module 1345 detached, the L+ port 1321 of the ear jack connector 1320 may transmit an L+ signal of the balanced signal received through the external electronic device 101 to the first output unit 1351 through the second transmission circuit 1362 and the first reception circuit 1365, the L-port 1322 may transmit an L− signal of the balanced signal to the first output unit 1351 through the second transmission circuit 1362 and the first reception circuit 1365, the R+ port 1323 may transmit an R+ signal of the balanced signal to the second output unit 1352 through the third transmission circuit 1363 and the third reception circuit 1368, and the R− port 1324 may transmit an R− signal to the second output unit 1352 through the fourth transmission circuit 1364 and the fifth second reception circuit 1369.

For example, as the external switching module 1344 is set to the ON state with the microphone module 1345 detached, the first output unit 1351 of an output unit 1350 may be configured to output the L+ signal of the balanced signal received from the L+ port 1321 and the L− signal of the balanced signal received from the L− port 1322. The second output unit 1352 may be configured to output the R+ signal of the balanced signal received from the R+ port 1323 and the R− signal of the balanced signal received from the R− port 1324.

Figure 13A:
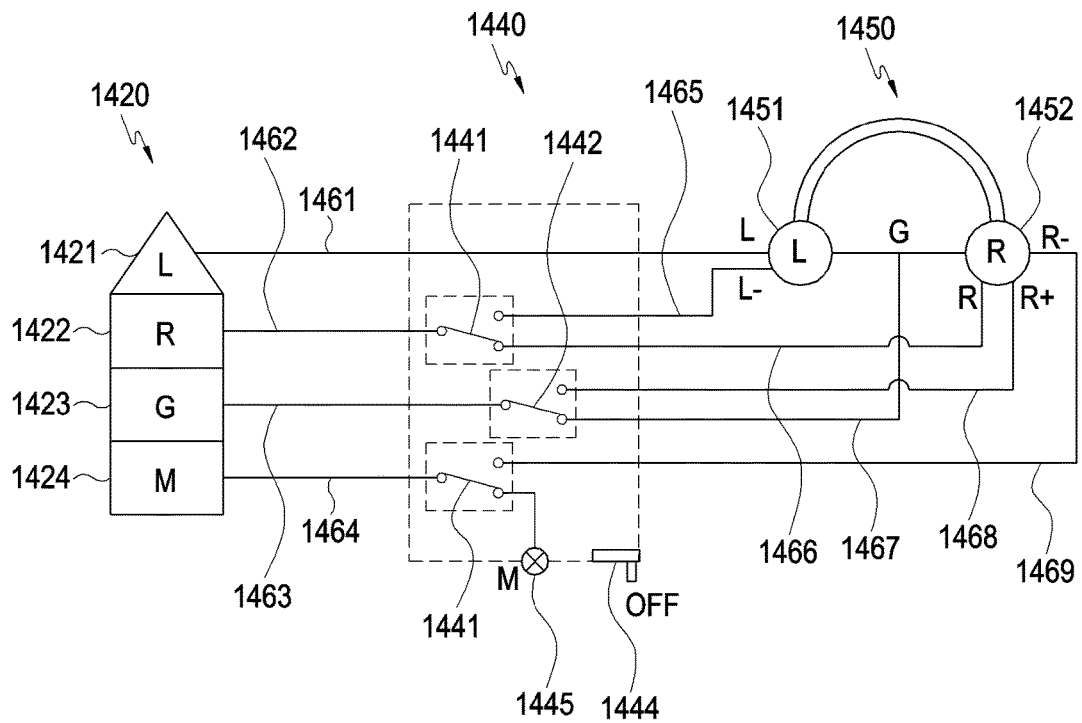
FIG. 13A is a circuit diagram illustrating an audio accessory switched to output an unbalanced signal according to another embodiment of the present disclosure.

FIG. 13A is a circuit diagram illustrating an audio accessory switched to output an unbalanced signal according to another embodiment of the present disclosure.

Referring to FIG. 13A, according to an embodiment of the present disclosure, as an attached-type microphone module 1445 is provided and an external switching module 1444 is set to an OFF state, a first switching module 1441 may be configured to connect a second transmission circuit 1462 to a second reception circuit 1466, a second switching module 1442 may be configured to connect a third transmission circuit 1463 to a fourth reception circuit 1467, and a third switching module 1443 may be configured to connect a fourth transmission circuit 1464 to the microphone module 1445.

For example, as the attached-type microphone module 1445 is provided and the external switching module 1444 is set to the OFF state, the external electronic device 101 may be configured to transmit an unbalanced signal to the audio accessory 286 in response to the state of the external switching module 1444.

According to an embodiment of the present disclosure, as the external switching module 1444 is set to the OFF state, an L port 1421 of an ear jack connector 1420 (for example, a 4-pole ear jack connector) may transmit an L signal of the unbalanced signal received through the external electronic device 101 to a first output unit 1451 of an output unit 1450 through a first transmission circuit 1461, an R port 1422 may transmit an R signal of the unbalanced signal received through the external electronic device 101 to a second output unit (R output unit) 1452 through the second transmission circuit 1462 and the second reception circuit 1466, and a G terminal 1423 may be connected to the first output unit 1451 and the second output unit 1452 through the third transmission circuit 1463 and the fourth reception circuit 1467, and an M port 1424 may receive a MIC signal from the microphone module 1445 through the fourth transmission circuit 1464.

For example, as the attached-type microphone module 1445 is provided and the external switching module 1444 is set to the OFF state, the first output unit 1451 may be configured to output the L signal of the unbalanced signal received from the L port 1421, and the second output unit 1452 may be configured to output the R signal of the unbalanced signal received from the R port 1422.

Figure 13B:
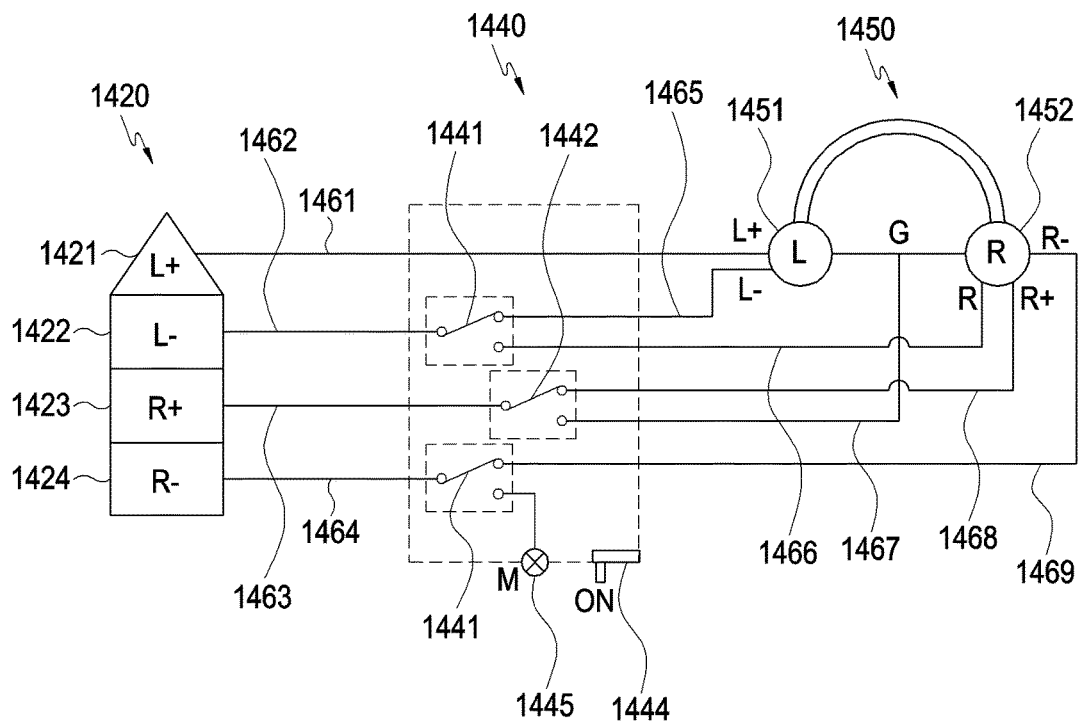
FIG. 13B is a circuit diagram illustrating an audio accessory switched to output a balanced signal according to another embodiment of the present disclosure.

FIG. 13B is a circuit diagram illustrating an audio accessory switched to output a balanced signal according to another embodiment of the present disclosure.

Referring to FIG. 13B, according to an embodiment of the present disclosure, as the attached-type microphone module 1445 is provided and the external switching module 1444 is set to an ON state, the first switching module 1441 may be configured to connect the second transmission circuit 1462 to a first reception circuit 1465, the second switching module 1442 may be configured to connect the third transmission circuit 1463 to a third reception circuit 1468, and the third switching module 1443 may be configured to connect the fourth transmission circuit 1464 to a fifth reception circuit 1469.

For example, as the external switching module 1444 is set to the ON state, the external electronic device 101 may be configured to transmit a balanced signal instead of an unbalanced signal to the audio accessory 286.

According to an embodiment of the present disclosure, as the attached-type microphone module 1445 is provided and the external switching module 1444 is set to the ON state, the L+ port 1421 of the ear jack connector 1420 (for example, a 4-pole ear jack connector) may transmit an L+ signal of the balanced signal received through the external electronic device 101 to the first output unit 1451 through the second transmission circuit 1462 and the first reception circuit 1465, the L− port 1422 may transmit an L− signal of the balanced signal received through the external electronic device 101 to the first output unit 1451 through the second transmission circuit 1462 and the first reception circuit 1465, the R+ port 1423 may transmit an R+ signal of the balanced signal to the second output unit 1352 through the third transmission circuit 1463 and the third reception circuit 1468, and the R− port 1424 may transmit an R− signal to the second output unit 1452 through the fourth transmission circuit 1464 and the fifth reception circuit 1469.

For example, as the attached-type microphone module 1445 is provided and the external switching module 1444 is set to the ON state, the first output unit 1451 of the output unit 1450 may be configured to output the L+ signal of the balanced signal received from the L+ port 1421 and the L− signal of the balanced signal received from the L− port 1422. The second output unit 1452 may be configured to output the R+ signal of the balanced signal received from the R+ port 1423 and the R− signal of the balanced signal received from the R− port 1424.

Figure 14:
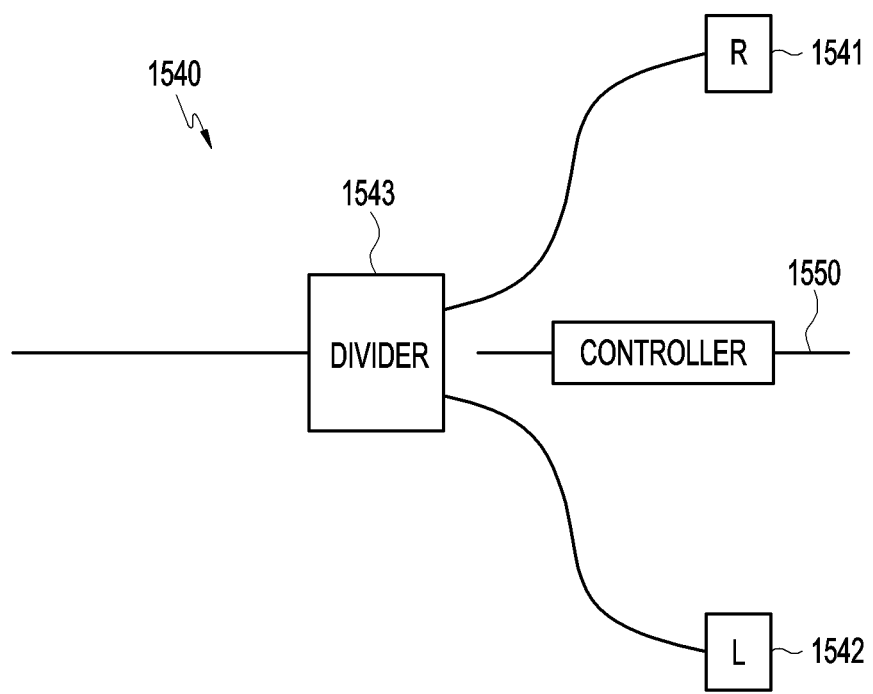
FIG. 14 is a diagram illustrating an audio accessory equipped with a detachable microphone module according to an embodiment of the present disclosure.

FIG. 14 illustrates an audio accessory having a detachable microphone module according to an embodiment of the present disclosure.

Referring to FIG. 14, an audio accessory 1540 includes an R output unit 1541 configured to output an R signal, or an R+ signal and an R− signal, an L output unit 1542 configured to output an L signal, or an L+ signal and an L− signal, and a divider 1543 configured to be connected to the R output unit 1541 and the L output unit 1542 and include a switching unit (for example, the switching unit 1440).

According to an embodiment of the present disclosure, the divider 1543 may be connected to a controller or a microphone module 1550. For example, the microphone module 1550 may be detached from or attached to the divider 1543. According to the detachment or attachment of the microphone module 1550, at least one switching module included in the divider 1543 may be controlled, and the polarity of at least one port (for example, at least one of the L+ port 1421, the L− port 1422, the R+ port 1423, and the R− port 1424) included in the ear jack connector 1420 (for example, a 4-pole ear jack connector) may be changed. Accordingly, at least one of the at least one port may be electrically connected to the R output unit 1541 or the L output unit 1542.

Figure 15:
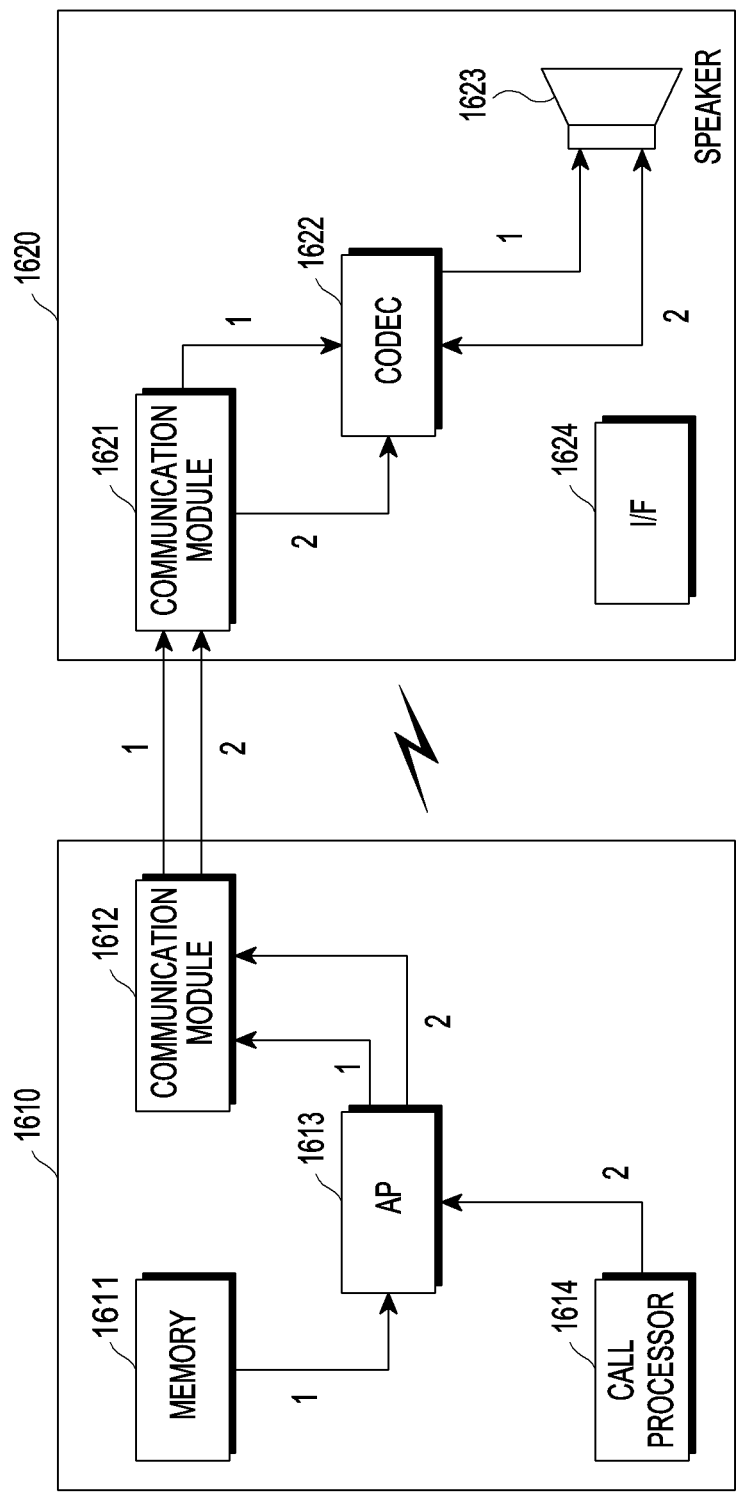
FIG. 15 is a block diagram illustrating an external electronic device and an audio accessory which are connected to each other by wireless communication according to an embodiment of the present disclosure.

FIG. 15 illustrates an external electronic device and an audio accessory which are connected to each other by wireless communication according to an embodiment of the present disclosure.

Referring to FIG. 15, according to an embodiment of the present disclosure, an external electronic device 1610 and an audio accessory 1620 may be configured to transmit and receive an unbalanced signal 2 or a balanced signal 1 by wireless communication.

As illustrated in FIG. 15, according to an embodiment of the present disclosure, the external electronic device 1610 includes a memory 1611 configured to store data of a signal, a call processor 1614 configured to conduct a call with another external electronic device (for example, the electronic device 102), and an AP 1613 configured to transmit a signal received through the memory 1611 and the call processor 1614 to the audio accessory 1620 through a communication module 1612.

For example, the AP 1613 may be configured to extract the balanced signal 1 (for example, a music signal) stored in the memory 1611 and transmit the extracted balanced signal 1 to the audio accessory 1620 through the communication module 1612.

For example, the AP 1613 may be configured to extract the unbalanced signal 2 (for example, a call signal) generated through the call processor 1614 and transmit the extracted unbalanced signal 2 to the audio accessory 1620 through the communication module 1612.

According to an embodiment of the present disclosure, a codec 1622 of the audio accessory 1620 may be configured to acquire the unbalanced signal 2 or the balanced signal 1 received from the external electronic device 1610 through the communication module 1621 and output the acquired unbalanced signal 2 or balanced signal 1 through a speaker 1623. The codec 1622 may be configured to convert the unbalanced signal 2 received from the external electronic device 1610 to the balanced signal 1 and output the converted balanced signal 1 through the speaker 1623.

According to an embodiment of the present disclosure, an I/F 1624 of the audio accessory 1620 may acquire the balanced signal 1 or the unbalanced signal 2 from a charging interface for charging the audio accessory 1620 or from the external electronic device by cable.

Figure 16:
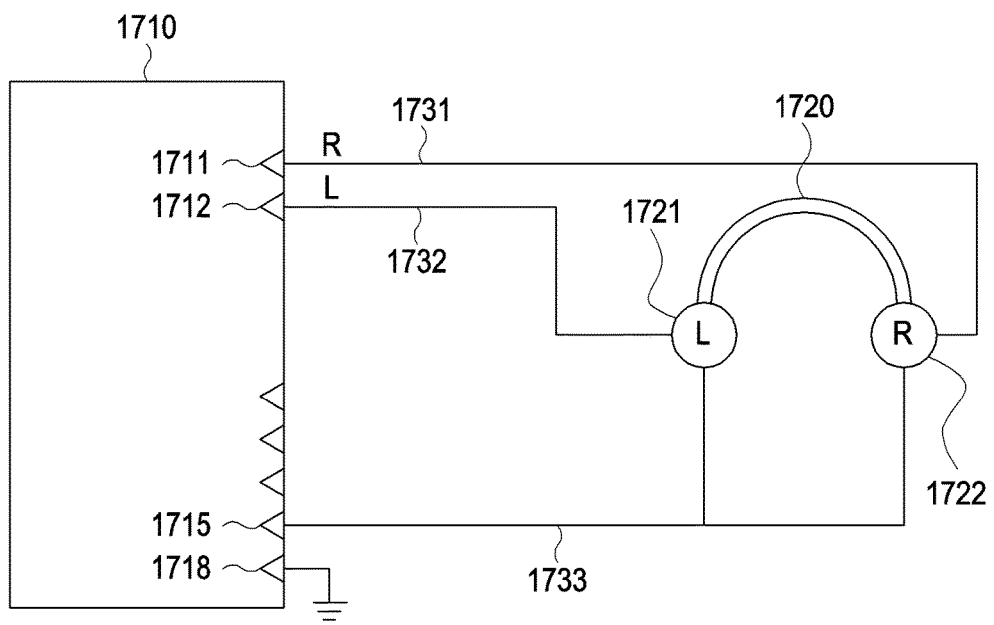
FIG. 16 is a block diagram illustrating an external electronic device and an audio accessory which are connected to each other by wireless communication according to another embodiment of the present disclosure.

FIG. 16 illustrates an external electronic device and an audio accessory which are connected to each other by wireless communication according to an embodiment of the present disclosure.

Referring to FIG. 16, for example, an external electronic device 1710 includes a first output port 1711 for transmitting an R signal of an unbalanced signal to an audio accessory 1720 through a first communication channel 1731, a second output port 1712 for transmitting an L signal of the unbalanced signal to the audio accessory 1720 through a second communication channel 1732, and a third output port 1715 for grounding the R and L signals of the unbalanced signal.

According to an embodiment of the present disclosure, the audio accessory 1720 includes an L output unit 1721 for receiving the L signal of the unbalanced signal from the second output port 1712 through the first communication channel 1731, and an R output unit 1722 for receiving the R signal of the unbalanced signal from the first output port 1711 through the second communication channel 1732.

Figure 17:
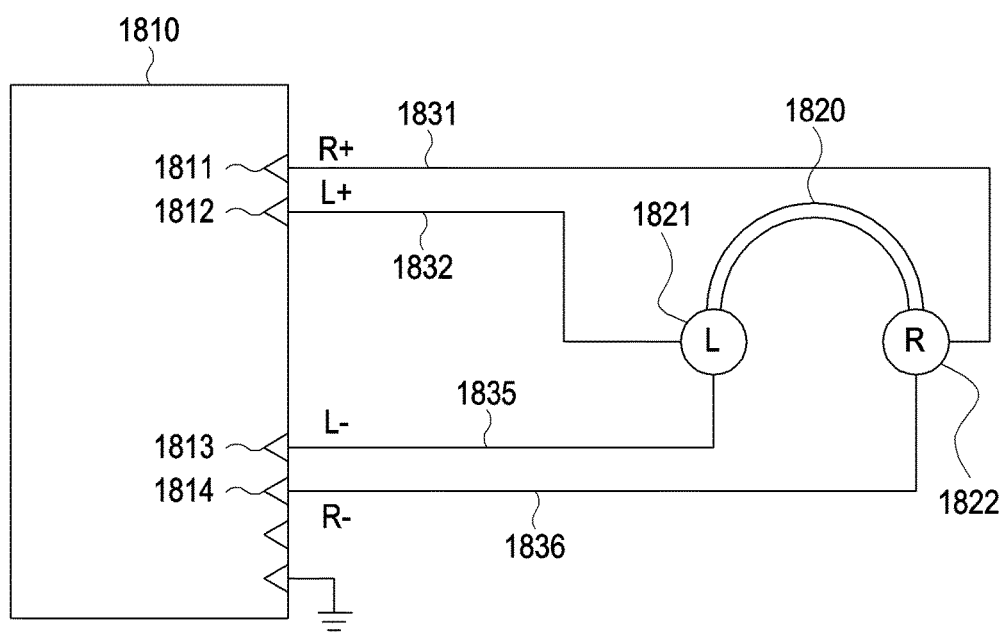
FIG. 17 is a block diagram illustrating an external electronic device and an audio accessory which are connected to each other by wireless communication according to another embodiment of the present disclosure.

FIG. 17 illustrates an external electronic device and an audio accessory which are connected to each other by wireless communication according to an embodiment of the present disclosure.

Referring to FIG. 17, for example, an external electronic device 1810 includes a first output port 1811 for transmitting an R+ signal of a balanced signal to an audio accessory 1820 through a first communication channel 1831, a second output port 1812 for transmitting an L+ signal of the balanced signal to the audio accessory 1820 through a second communication channel 1832, a third output port 1813 for transmitting an L-signal of the balanced signal to the audio accessory 1820 through a third communication channel 1833, and a fourth output port 1814 for transmitting an R− signal of the balanced signal to the audio accessory 1820 through a fourth communication channel 1834.

According to an embodiment of the present disclosure, the audio accessory 1820 includes an L output unit 1821 for receiving the L+ signal of the balanced signal from the second output port 1812 and receiving the L− signal of the balanced signal from the third output port 1813, and an R output unit 1822 for receiving the R+ signal of the balanced signal from the first output port 1811 and receiving the R− signal of the balanced signal from the fourth output port 1814.

As is apparent from the foregoing description, according to an embodiment of the present disclosure, the usability of a mobile terminal may be increased because no additional cable is required for switching the output mode of the sound signal between an unbalanced mode and a balanced mode.

According to an embodiment of the present disclosure, high-quality music may be played back even when a bundle earphone including a single ear connector is used.

According to an embodiment of the present disclosure, a wireless audio accessory may automatically switch between an unbalanced mode and a balanced mode according to function selection (for example, microphone needed or not needed). Thus, the wireless audio accessory may be differentiated from existing products and have increased usability.

The term 'module' as used herein may include its ordinary meaning including, for example, a unit of one, or a combination of two or more of hardware, software, and firmware. The term 'module' may be used interchangeably with terms such as, for example, unit, logic, logical block, component or circuit. A 'module' may be the smallest unit of an integrated part or a portion thereof. A 'module' may be the smallest unit for performing one or more functions, or a portion thereof. A 'module' may be implemented mechanically, or electronically. For example, a 'module' may include at least one of a known, or to-be-developed, application-specific integrated circuit (ASIC) chip, field-programmable gate array (FPGA) or programmable logic device that perform certain operations.

At least a part of apparatuses (for example, modules or their functions) or methods (for example, operations) according to an embodiment of the present disclosure may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to an embodiment of the present disclosure.

A module or a programming module according to an embodiment of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

The embodiments disclosed in the present specification are provided for description and understanding of the present disclosure, and do not limit the scope of the present disclosure. Accordingly, the scope of the present disclosure should be interpreted as embracing all modifications or an embodiment within the scope of the present disclosure as described by the appended claims and their equivalents.

What is claimed is:
1. An audio accessory comprising:
    a connector configured to be connected to an external device, wherein the connector includes first to fourth ports, and receives a plurality of sound signals;
    a speaker connected to the first to fourth ports;
    a switching unit; and
    a processor configured to:
        select at least one signal path of at least part of the plurality of sound signals according to whether the plurality of sound signals are in a balanced mode or an unbalanced mode; and
        output a sound through the speaker based on the plurality of sound signals which are transmitted through the selected at least one signal path,
    wherein, when the plurality of sound signals are in the balanced mode, polarities of the first to fourth ports include left positive (L+1), right positive (R+1), left negative (L−), and right negative (R−) polarities.

2. The audio accessory of claim 1, wherein the connector includes a communication module and the processor is further configured to receive, through the communication module, a control signal related to the sound from the external device.

3. The audio accessory of claim 2, wherein the processor is further configured to select the balanced mode or the unbalanced mode based on at least the control signal.

4. The audio accessory of claim 1, wherein the processor is further configured to select the balanced mode or the unbalanced mode based on at least a property of the plurality of sound signals.

5. An audio accessory comprising:
    a speaker;
    an ear jack connector configured to receive a plurality of sound signals from an external electronic device and including first to fourth ports;
    a switching unit; and
    a processor, wherein the processor is configured to:
        select between balanced mode and unbalanced mode, for outputting a sound;
        switch between a first sound output path for at least part of the plurality of sound signals corresponding to the balanced mode and a second sound output path corresponding to the unbalanced mode based on the selected output mode; and
        output a sound in the selected sound output path through the speaker,
    wherein when the plurality of sound signals are in the balanced mode, polarities of the first to fourth ports include left positive (L+), right positive (R+), left negative (L−), and right negative (R−) polarities.

6. The audio accessory of claim 5, wherein the first to fourth ports are connected to the speaker through the first sound output path and the second sound output path, and wherein the processor is further configured to electrically connect at least one of the first to fourth ports of the ear jack connector to the speaker by the switching unit.

7. The audio accessory of claim 6, wherein the ear jack connector is further configured to change a polarity of at least one of the first to fourth ports in correspondence with the selected mode.

8. The audio accessory of claim 7, wherein the ear jack connector is further configured to include left, right, ground, and microphone polarities when the plurality of sound signals are in the unbalanced mode.

9. The audio accessory of claim 7, wherein the speaker includes a first speaker and a second speaker, and wherein the processor is further configured to output, through the first speaker, a sound from a port having the L+ polarity and a port having the L− polarity.

10. The audio accessory of claim 6, wherein the switching unit includes an external switch, and wherein the first to fourth ports of the ear jack connector are electrically connected to the speaker according to an on state or an off state of the external switch.

11. The audio accessory of claim 6, wherein the switching unit includes a microphone, and wherein the first to fourth ports of the ear jack connector are electrically connected to the speaker according to detachment or attachment of the microphone.

12. The audio accessory of claim 6, wherein the speaker is configured to output the sound based on a plurality of balanced signals or a plurality of unbalanced signals according to the selected mode.

13. An audio output method comprising:
connecting to an external device;
outputting a sound based on a plurality of sound signals received from the external device through at least one signal path, wherein the sound is output via an ear jack connector including first to fourth ports; and
selecting the at least one signal path according to whether the plurality of sound signals are in a balanced mode or an unbalanced mode,
wherein when the plurality of sound signals are in the balanced mode, polarities of the first to fourth ports include left positive (L+), right positive (R+), left negative (L−), and right negative (R−) polarities.

14. The audio output method of claim 13, further comprising receiving a control signal related to the plurality of sound signals from the external device.

15. The audio output method of claim 14, wherein selecting the at least one signal path comprises selecting the balanced mode or the unbalanced mode based on at least the control signal.

16. The audio output method of claim 13, wherein selecting the at least one signal path comprises selecting the balanced mode or the unbalanced mode based on at least a property of the plurality of sound signals.

* * * * *